US012223276B2

(12) United States Patent
Vishnoi et al.

(10) Patent No.: US 12,223,276 B2
(45) Date of Patent: *Feb. 11, 2025

(54) AUTOMATIC OUT OF SCOPE TRANSITION FOR CHATBOT

(71) Applicant: Oracle International Corporation, Redwood Shores, CA (US)

(72) Inventors: Vishal Vishnoi, Redwood City, CA (US); Xin Xu, San Jose, CA (US); Elias Luqman Jalaluddin, Seattle, WA (US); Srinivasa Phani Kumar Gadde, Belmont, CA (US); Crystal C. Pan, Palo Alto, CA (US); Mark Edward Johnson, Castle Cove (AU); Thanh Long Duong, Pointcook (AU); Balakota Srinivas Vinnakota, Sunnyvale, CA (US); Manish Parekh, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,178

(22) Filed: Jan. 26, 2024

(65) Prior Publication Data

US 2024/0169155 A1 May 23, 2024

Related U.S. Application Data

(63) Continuation of application No. 17/490,792, filed on Sep. 30, 2021, now Pat. No. 11,922,123.
(Continued)

(51) Int. Cl.
*G06F 40/295* (2020.01)
*G06F 40/211* (2020.01)
(Continued)

(52) U.S. Cl.
CPC .......... *G06F 40/295* (2020.01); *G06F 40/211* (2020.01); *G06F 40/35* (2020.01); *G06F 40/56* (2020.01); *G06N 5/043* (2013.01)

(58) Field of Classification Search
CPC .. G06F 40/295211; G06F 40/35; G06N 5/043
See application file for complete search history.

(56) References Cited

U.S. PATENT DOCUMENTS 10,957,311 B2 * 3/2021 Solomon ................ H04N 23/11
11,392,773 B1 * 7/2022 Gangadharaiah ..... G06F 40/242
(Continued)

FOREIGN PATENT DOCUMENTS

EP        3832644 A1 *  6/2021  ............. G06F 3/167
WO  WO-2017100334 A1 *  6/2017  ............. G06F 3/017
(Continued)

OTHER PUBLICATIONS

U.S. Appl. No. 17/490,792, "Non-Final Office Action", Jun. 16, 2023, 13 pages.
(Continued)

*Primary Examiner* — Anne L Thomas-Homescu
(74) *Attorney, Agent, or Firm* — Kilpatrick Townsend & Stockton LLP

(57) ABSTRACT

Techniques for automatically switching between chatbot skills in the same domain. In one particular aspect, a method is provided that includes receiving an utterance from a user within a chatbot session, where a current skill context is a first skill and a current group context is a first group, inputting the utterance into a candidate skills model for the first group, obtaining, using the candidate skills model, a ranking of skills within the first group, determining, based on the ranking of skills, a second skill is a highest ranked skill, changing the current skill context of the chatbot session to the second skill, inputting the utterance into a
(Continued)

candidate flows model for the second skill, obtaining, using the candidate flows model, a ranking of intents within the second skill that match the utterance, and determining, based on the ranking of intents, an intent that is a highest ranked intent.

15 Claims, 15 Drawing Sheets

Related U.S. Application Data

(60) Provisional application No. 63/085,796, filed on Sep. 30, 2020.

(51) Int. Cl.
  *G06F 40/35* (2020.01)
  *G06F 40/56* (2020.01)
  *G06N 5/043* (2023.01)

(56) References Cited

U.S. PATENT DOCUMENTS

| | | | |
|---|---|---|---|
| 11,922,123 B2 | 3/2024 | Vishnoi et al. | |
| 2017/0180284 A1 | 6/2017 | Smullen et al. | |
| 2018/0330723 A1* | 11/2018 | Acero | G10L 15/30 |
| 2019/0324779 A1* | 10/2019 | Martin | G06F 3/0481 |
| 2020/0285698 A1* | 9/2020 | Azevedo | G10L 15/18 |
| 2020/0327134 A1* | 10/2020 | Freed | G06F 16/288 |
| 2020/0342850 A1* | 10/2020 | Vishnoi | G06F 40/30 |
| 2020/0357409 A1* | 11/2020 | Sun | G10L 15/197 |
| 2020/0380963 A1* | 12/2020 | Chappidi | G06F 40/30 |
| 2021/0090575 A1* | 3/2021 | Mahmood | G10L 17/10 |
| 2021/0174806 A1* | 6/2021 | Krishnaswamy | G10L 15/16 |
| 2022/0084526 A1* | 3/2022 | Freed | G10L 17/04 |

FOREIGN PATENT DOCUMENTS

| | | | | |
|---|---|---|---|---|
| WO | WO-2018212938 A1 * | 11/2018 | | G10L 15/04 |
| WO | WO-2018213415 A1 * | 11/2018 | | G06F 21/32 |
| WO | WO-2019231530 A1 * | 12/2019 | | G06F 3/167 |
| WO | WO-2020142681 A1 * | 7/2020 | | |

OTHER PUBLICATIONS

U.S. Appl. No. 17/490,792, "Notice of Allowance", Dec. 1, 2023, 9 pages.
Bassett, et al., "Using Oracle Digital Assistant", Oracle® Cloud, Sep. 2021, 1162 pages.
International Application No. PCT/US2021/052916, "International Preliminary Report on Patentability", Apr. 13, 2023, 9 pages.
International Application No. PCT/US2021/052916, "International Search Report and Written Opinion", Jan. 10, 2022, 12 pages.
European Application No. 21798883.1, Summons to Attend Oral Proceedings mailed Jun. 24, 2024, 10 pages.

\* cited by examiner

600

| Intent Calls for sentence 'order pizza' | |
|---|---|
| Action | Details |
| System Intents<br>605 | Digital Assistant: ODA_Pizza_Financial_Retail<br>No Intents matched for the selected query<br>*Confidence Threshold: 60%*<br>*Confidence Win Margin: 10%*<br>*Consider All Confidence Threshold: 80%* |
| Candidate Skills<br>610 | Digital Assistant: ODA_Pizza_Financial_Retail<br>    Skill: Pizza Skill            Score: 100%<br>    Skill: Retail Skill           Score: 21.56%<br>Confidence Threshold: 40%<br>Confidence Win Margin: 10%<br>Consider All Confidence Threshold: 80% |
| Candidate Flows<br>615 | Skill: Pizza Skill<br>    Intent: Order Pizza       Score: 100%<br>Confidence Threshold: 40%<br>Confidence Win Margin: 10%<br>Consider All Confidence Threshold: 80% |

| Intent Calls for sentence 'what is my balance' | |
|---|---|
| Action | Details |
| System Intents<br>705 | Digital Assistant: ODA_Pizza_Financial_Retail<br>No Intents matched for the selected query<br>*Confidence Threshold: 60%*<br>*Confidence Win Margin: 10%*<br>*Consider All Confidence Threshold: 80%* |
| Candidate Skills<br>710 | Digital Assistant: ODA_Pizza_Financial_Retail<br>    Skill: Fin Skill              Score: 100%<br>    Skill: Retail Skill           Score: 100%<br>    Skill: Pizza Skill            Score: 33.31%<br>Confidence Threshold: 40%<br>Confidence Win Margin: 10%<br>Consider All Confidence Threshold: 80% |
| Candidate Flows<br>715 | Skill: Retail Skill<br>    Intent: Gift Card Balance    Score: 100%<br>Confidence Threshold: 40%<br>Confidence Win Margin: 10%<br>Consider All Confidence Threshold: 80% |
| Candidate Flows<br>715 | Skill: Fin Skill<br>    Intent: Balances          Score: 100%<br>Confidence Threshold: 40%<br>Confidence Win Margin: 10%<br>Consider All Confidence Threshold: 80% |

| | |
|---|---|
| Intent Calls for sentence 'now check balance in Retail Skill' | |
| Action | Details |
| System Intents | Digital Assistant: ODA_Pizza_Financial_Retail<br>No Intents matched for the selected query<br>*Confidence Threshold: 60%*<br>*Confidence Win Margin: 10%*<br>*Consider All Confidence Threshold: 80%* |
| Candidate Skills | Digital Assistant: ODA_Pizza_Financial_Retail<br>    Skill: Fin Skill                  Score: 36.05%<br>    Skill: Retail Skill              Score: 33.15%<br>Confidence Threshold: 40%<br>Confidence Win Margin: 10%<br>Consider All Confidence Threshold: 80% |
| Current Context<br>805 | Skill: Fin Skill<br>    Intent: Track Spending       Score: 58.85%<br>    Intent: Balances              Score: 35.38%<br>    Intent: Send Money         Score: 20.58%<br>    Intent: Transactions        Score: 14.66%<br>Confidence Threshold: 40%<br>Confidence Win Margin: 10%<br>Consider All Confidence Threshold: 80% |

| | |
|---|---|
| Intent Calls for sentence 'now check balance' | |
| Action | Details |
| Explicit Invocation<br>810 | Skill: Retail Skill<br>    Intent: GiftCardBalance     Score: 100%<br>Confidence Threshold: 40%<br>Confidence Win Margin: 10%<br>Consider All Confidence Threshold: 80% |

Intent Calls for sentence 'what is my balance'

| Action | Details |
|---|---|
| System Intents | Digital Assistant: ODA_Pizza_Financial_Retail<br>No Intents matched for the selected query<br>*Confidence Threshold: 60%*<br>*Confidence Win Margin: 10%*<br>*Consider All Confidence Threshold: 80%* |
| Candidate Skills | Digital Assistant: ODA_Pizza_Financial_Retail<br>    Skill: Fin Skill    Score: 100%<br>    Skill: Retail Skill    Score: 100%<br>    Skill: Pizza Skill    Score: 33.31%<br>Confidence Threshold: 40%<br>Confidence Win Margin: 10%<br>Consider All Confidence Threshold: 80% |
| | Skill: Retail Skill<br>    Intent: GiftCardBalance    Score: 100%<br>Confidence Threshold: 40%  905<br>Confidence Win Margin: 10%<br>Consider All Confidence Threshold: 80% |
| Current Context 910 | Skill: Fin Skill<br>    Intent: Balances  915  Score: 100%<br>Confidence Threshold: 40%<br>Confidence Win Margin: 10%<br>Consider All Confidence Threshold: 80% |
| | Skill: Fin Skill<br>    Intent: Balances    Score: 100%<br>Confidence Threshold: 40%<br>Confidence Win Margin: 10%<br>Consider All Confidence Threshold: 80% |

| Conversation Routing JSON 1005 | Routing rule is output when skill context |
|---|---|
| Rules | changes due to Group stickiness |

| Details | Payload |
|---|---|
| Consider flows from all models | View JSON | ntent Calls for sentence 'my account is locked'

| Action | Details | Payload |
|---|---|---|
| System Intents | Digital Assistant: NvidiaDigitalAssistant<br>Skill: unresolvedintent | Score: 0%  View JSON |

New Rule:

| Rules 1010 | |
|---|---|
| Details | Payload |
| Current context is switched to highest confidence skill in group | View JSON |
| Current context flows matches with very high confidence. Other skill flows are ignored. | View JSON |

FIG. 10A

Conversation Routing JSON                                                      1000

| | Intent Calls for sentence 'I want to change my battery tray' | |
|---|---|---|
| Action | Details | |
| System Intents | Digital Assistant: NvidiaDigitalAssistant<br>   Skill: unresolvedintent<br>Confidence Threshold: 70%<br>Confidence Win Margin: 10%<br>Consider All Confidence Threshold: 90% | Score: 0% |
| System Intents | Digital Assistant: NvidiaDigitalAssistant<br>   Skill: unresolvedintent<br>Confidence Threshold: 70%<br>Confidence Win Margin: 10%<br>Consider All Confidence Threshold: 90% | Score: 0% |
| Candidate Skills | Digital Assistant: NvidiaDigitalAssistant<br>   Skill: Nvidia_Driver_Installation_BatteryTray-1.15  Score: 100%<br>   Skill: NvidiaCommonSkillTemplate-1.19  Score: 0%<br>   Skill: Nvidia_AccountandBilling-1.15  Score: 0%<br>   Skill: unresolvedintent  Score: 0%<br>Confidence Threshold: 70%<br>Confidence Win Margin: 10%<br>Consider All Confidence Threshold: 90% | Group context of<br>current context skill |
| Current Context<br>1020 | Skill: NvidiaAccount  Group Context: nvdia.software  1015<br>Intent: unresolvedintent  Score: 99.79%<br>Intent: EmailChangeRequest  Score: 0.13%<br>Intent: Transfer to an Agent  Score: 0.08%<br>Intent: AccountLocked  Score: 0%<br>Confidence Threshold: 70%<br>Confidence Win Margin: 10%<br>Consider All Confidence Threshold: 90%<br>Group: nvdia.software | Groups of current<br>context skill. 1015 |
| Candidate Flows<br>1025 | Skill: Nvidia Driver Installation | Also specify for each<br>candidate flow |

FIG. 10B

| Routing 1030 | | Group context after we chose the flow | |
|---|---|---|---|
| Action | Details | | Payload |
| Router response<br>1035 | Skill: Nvidia Account<br>Intent: AccountLocked<br>Group Context: nvdia.software  1015 | Score: 100% | View JSON |
| Utterance | Sentence: my account is locked<br>Reformed Sentence: my account is locked | | View JSON |
| Starting context-<br>aware routing. | Conversation State: START_FIRST_FLOW | | View JSON |

FIG. 10C

AUTOMATIC OUT OF SCOPE TRANSITION FOR CHATBOT

CROSS REFERENCE TO RELATED APPLICATIONS

This application is a continuation of U.S. patent application Ser. No. 17/490,792, filed Sep. 30, 2021, which claims priority to U.S. Provisional Application No. 63/085,796, filed on Sep. 30, 2020, which are incorporated herein by reference in their entireties for all purposes.

FIELD

The present disclosure relates generally to chatbots, and more particularly, to techniques for automatically switching between chatbot skills in the same domain.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

BRIEF SUMMARY

Techniques are provided (e.g., a method, a system, non-transitory computer-readable medium storing code or instructions executable by one or more processors) for automatically switching between chatbot skills in the same domain.

In various embodiments, a computer implemented method is provided that comprise: receiving an utterance from a user within a chatbot session, wherein a current skill context of the chatbot session is a first skill and a current group context of the chatbot session is a first group; inputting the utterance into a candidate skills model for the first group; obtaining, using the candidate skills model, a ranking of skills within the first group that could potentially process the utterance; determining, based on the ranking of skills, a second skill is a highest ranked skill for processing the utterance; changing the current skill context of the chatbot session to the second skill; inputting the utterance into a candidate flows model for the second skill; obtaining, using the candidate flows model, a ranking of intents within the second skill that match the utterance; and determining, based on the ranking of intents, an intent that is a highest ranked intent for processing the utterance.

In some embodiments, the obtaining the ranking of skills comprises evaluating the utterance and generating confidence scores for the skills within the first group, identifying any skill with a confidence score exceeding a value of a candidate skills confidence threshold routing parameter as a candidate skill for further evaluation, and ranking the candidate skills based on the confidence scores as skills within the first group that could potentially process the utterance.

In some embodiments, the obtaining the ranking of intents comprises evaluating the intents and generating confidence scores for the intents within the second skill, identifying any intent with a confidence score exceeding a value of a confidence threshold routing parameter as a candidate skill for further evaluation, and ranking the candidate intents based on the confidence scores as intents within the first skill that match the utterance.

In some embodiments, the method further comprises initiating a conversation flow in the chatbot session with the user based on the intent that is the highest ranked intent for processing the utterance.

In some embodiments, the method further comprises: receiving an initial utterance from a user within the chatbot session, wherein the initial utterance is receive prior to the utterance; inputting the initial utterance into the candidate skills model; obtaining, using the candidate skills model, a ranking of skills that could potentially process the initial utterance; determining, based on the ranking of skills, the first skill is a highest ranked skill for processing the initial utterance; assigning the current skill context of the chatbot session to the first skill and the current group context of the chatbot session to the first group, wherein the first group is defined for the first skill, and the assignment of the current group context of the chatbot session to the first group is performed based on the first group being defined for the first skill.

In some embodiments, the method further comprises: receiving a subsequent utterance from the user within the chatbot session, wherein the current skill context of the chatbot session is the second skill and the current group context of the chatbot session is the first group; inputting the subsequent utterance into the candidate skills model for the first group; obtaining, using the candidate skills model, a ranking of skills within the first group that could potentially process the subsequent utterance; determining, based on the ranking of skills, an unresolved intent skill is a highest ranked skill for processing the subsequent utterance; inputting the subsequent utterance into another candidate skills model; obtaining, using another candidate skills model, a ranking of skills that could potentially process the subsequent utterance; determining, based on the ranking of skills, a third skill is a highest ranked skill for processing the subsequent utterance; and assigning the current skill context of the chatbot session to the third skill and the current group context of the chatbot session to a second group, wherein the second group is defined for the third skill, and the assignment of the current group context of the chatbot session to the second group is performed based on the second group being defined for the third skill.

In some embodiments, the method further comprises: determining, based on the ranking of skills, a third skill is a second highest ranked skill for processing the utterance; determining both the second skill and the third skill are within a win margin parameter; in response to determining both the second skill and the third skill are within the win margin parameter, inputting the utterance into: the candidate flows model for the second skill and another candidate flows model for the third skill; obtaining, using the another candidate flows model, a ranking of intents within the third skill that match the utterance; and determining, based on the ranking of intents within the second skill and the third skill, an intent that is a highest ranked intent for processing the utterance.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6 depicts intent calls for an exemplary utterance in accordance with various embodiments.

FIG. 7 depicts intent calls for another exemplary utterance in accordance with various embodiments.

FIG. 8 depicts intent calls for another exemplary utterance in accordance with various embodiments.

FIG. 9 depicts intent calls for another exemplary utterance in accordance with various embodiments.

FIGS. 10A-10C depict skills group context modifications to a rules output, intent calls, and a routing summary, respectively, in accordance with various embodiments.

DETAILED DESCRIPTION

Figure 1:
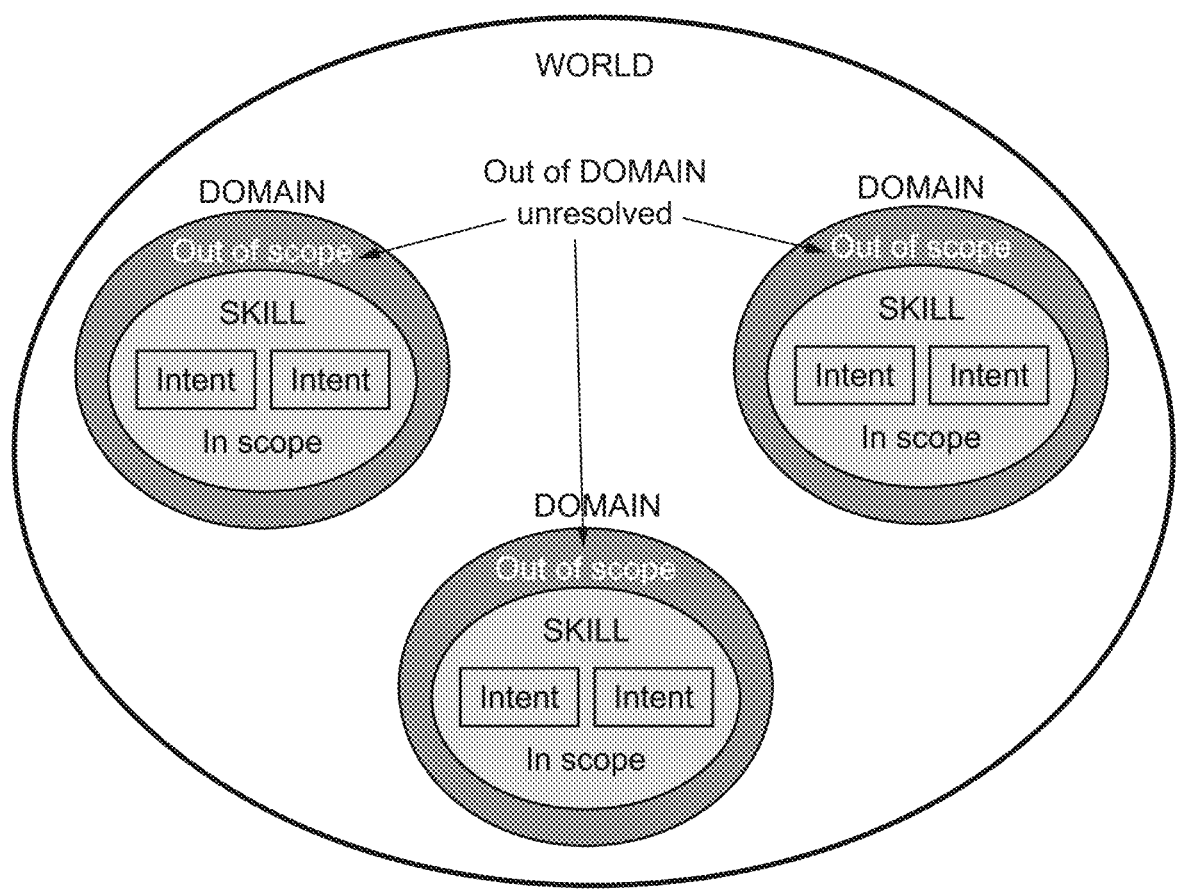
FIG. 1 depicts a simplified diagram illustrating in domain, out of domain, in scope, and out of scope concepts in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

A digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow the chatbot to understand what the user wants the chatbot to do. Intents are comprised of permutations of typical user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing, but are expressed differently. Collectively, the intents, and the utterances that belong to them, make up a training corpus for the chatbot. By training a model with the corpus, a customer may essentially turn that model into a reference tool for resolving end user input to a single intent. A customer can improve the acuity of the chatbot's cognition through rounds of intent testing and intent training.

The utterances that a chatbot receives from actual users in the real world environment (e.g., in the production environment) can however be quite varied and noisy. Some of these received utterances can be very different from the utterances used to train the chatbot and may not fall within the intents that the chatbot is trained to infer and handle. For example, a banking chatbot could receive an utterance such as "How do I book a trip to Italy?" that has nothing to do with banking Such utterances are referred to as out-of-domain (OOD) utterances since they are not within the domain of intents of the trained chatbot, as shown in FIG. 1. It is important for a chatbot system to be able to identify such OOD utterances such that proper responsive actions can be taken. For example, upon detecting an OOD utterance, the chatbot may respond to the user indicating that the utterance is not one that the bot can process or handle rather than select a closest matching intent.

Moreover, groups of skills or chatbots may be deployed as part of a same domain Typically these skills are developed by different groups or departments of an enterprise within a same domain In such instances, it will be common for a chatbot to receive utterances about intents that belong to different skills in the same domain. For example, a compensation chatbot in the Human Capital Management (HCM) domain could receive an utterance such as "What are my benefits" that has nothing to do with compensation but does have to do with benefits which is part of the HCM domain. Such utterances are referred to as out-of-scope (OOS) utterances since they are not within the scope of intents of the trained chatbot, as shown in FIG. 1. Since the skills are part of the same domain, a user may get stuck in skill A (e.g., the compensation chatbot) as questions relating to skill B (e.g., a benefits chatbot) in the same domain are out of scope in Skill A but would pass through Skill A's OOD detector and also potentially match with an intent in Skill A with relatively high confidence. It is important for a chatbot system to be able to identify such OOS utterances such that proper responsive actions can be taken. For example, upon detecting an OOS utterance, a context aware router will route the utterance from the current chatbot (e.g., the compensation chatbot) to the most relevant chatbot within a defined group of the domain (e.g., a benefits chatbot).

The present disclosure describes various embodiments for addressing problems with identifying OOS utterances and providing for OOS transition between skills within a same domain In certain embodiments, grouping and routing-based techniques are used for the OOS determination and transition. In an illustrative embodiment, a computer implemented method is provided that comprises: receiving an utterance from a user within a chatbot session, wherein a current skill context of the chatbot session is a first skill and a current group context of the chatbot session is a first group; inputting the utterance into a candidate skills model for the first group; obtaining, using the candidate skills model, a ranking of skills within the first group that could potentially process the utterance; determining, based on the ranking of skills, a second skill is a highest ranked skill for processing the utterance; changing the current skill context of the chatbot session to the second skill; inputting the utterance into a candidate flows model for the second skill; obtaining, using the candidate flows model, a ranking of intents within the second skill that match the utterance; and determining, based on the ranking of intents, an intent that is a highest ranked intent for processing the utterance.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

Figure 2:
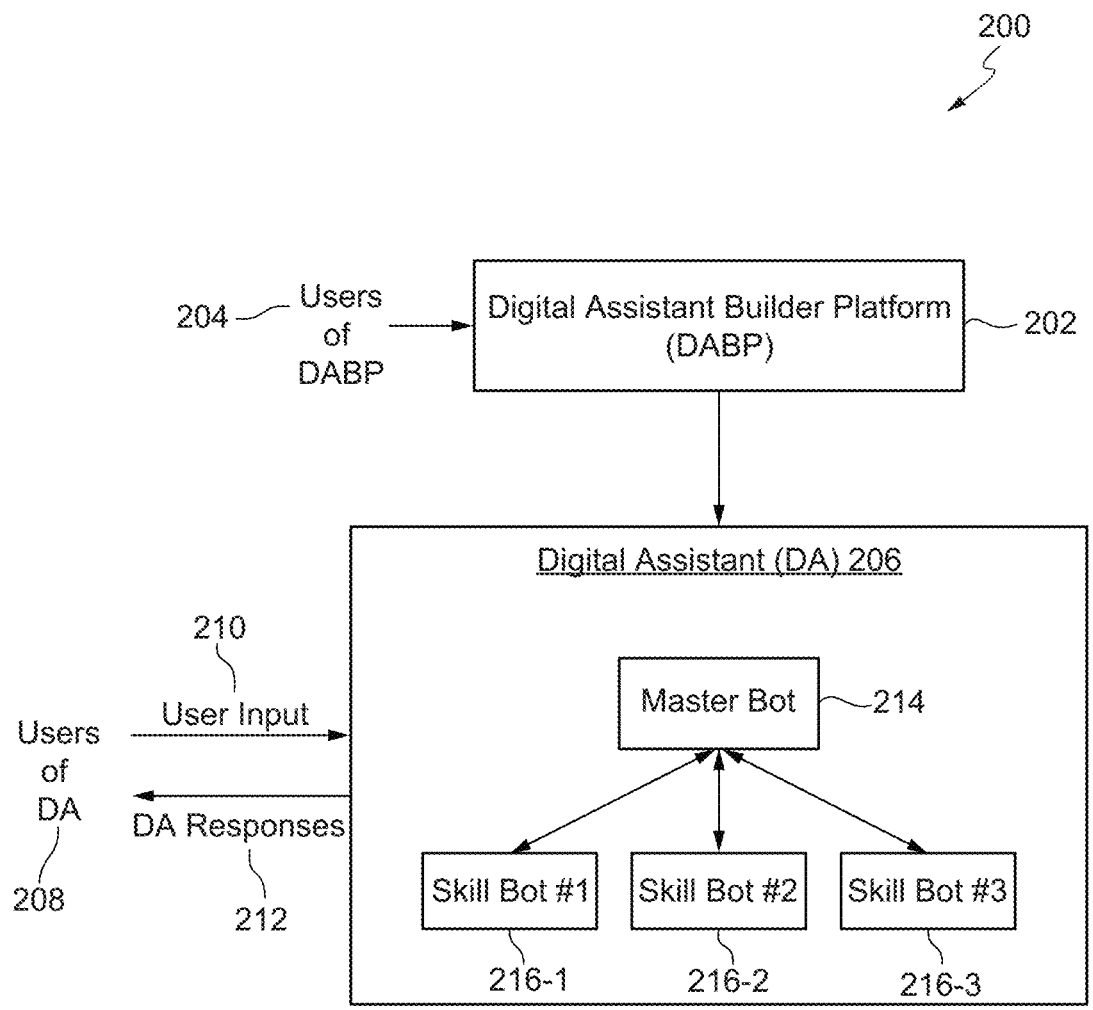
FIG. 2 depicts a simplified block diagram of a distributed environment incorporating an exemplary embodiment.

FIG. 2 is a simplified block diagram of an environment 200 incorporating a chatbot system according to certain embodiments. Environment 200 comprises a digital assistant builder platform (DABP) 202 that enables users of DABP 202 to create and deploy digital assistants or chatbot systems. DABP 202 can be used to create one or more digital assistants (or DAs) or chatbot systems. For example, as shown in FIG. 2, user 204 representing a particular enterprise can use DABP 202 to create and deploy a digital assistant 206 for users of the particular enterprise. For example, DABP 202 can be used by a bank to create one or more digital assistants for use by the bank's customers. The same DABP 202 platform can be used by multiple enterprises to create digital assistants. As another example, an owner of a restaurant (e.g., a pizza shop) may use DABP 202 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 206 built using DABP 202, can be used to perform various tasks via natural language-based conversations between the digital assistant and its users 208. As part of a conversation, a user may provide one or more user inputs 210 to digital assistant 206 and get responses 212 back from digital assistant 206. A conversation can include one or more of inputs 210 and responses 212. Via these conversations, a user can request one or more tasks to be performed by the digital assistant and, in response, the digital assistant is configured to perform the user-requested tasks and respond with appropriate responses to the user.

User inputs 210 are generally in a natural language form and are referred to as utterances. A user utterance 210 can be in text form, such as when a user types in a sentence, a question, a text fragment, or even a single word and provides the text as input to digital assistant 206. In some embodiments, a user utterance 210 can be in audio input or speech form, such as when a user says or speaks something that is provided as input to digital assistant 206. The utterances are typically in a language spoken by the user 208. For example, the utterances may be in English, or some other language. When an utterance is in speech form, the speech input is converted to text form utterances in that particular language and the text utterances are then processed by digital assistant 206. Various speech-to-text processing techniques may be used to convert a speech or audio input to a text utterance, which is then processed by digital assistant 206. In some embodiments, the speech-to-text conversion may be done by digital assistant 206 itself.

An utterance, which may be a text utterance or a speech utterance, can be a fragment, a sentence, multiple sentences, one or more words, one or more questions, combinations of the aforementioned types, and the like. Digital assistant 206 is configured to apply natural language understanding (NLU) techniques to the utterance to understand the meaning of the user input. As part of the NLU processing for an utterance, digital assistant 206 is configured to perform processing to understand the meaning of the utterance, which involves identifying one or more intents and one or more entities corresponding to the utterance. Upon understanding the meaning of an utterance, digital assistant 206 may perform one or more actions or operations responsive to the understood meaning or intents. For purposes of this disclosure, it is assumed that the utterances are text utterances that have been provided directly by a user 208 of digital assistant 206 or are the results of conversion of input speech utterances to text form. This however is not intended to be limiting or restrictive in any manner.

For example, a user 208 input may request a pizza to be ordered by providing an utterance such as "I want to order a pizza." Upon receiving such an utterance, digital assistant 206 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 206 may also be in natural language form and typically in the same language as the input utterance. As part of generating these responses, digital assistant 206 may perform natural language generation (NLG). For the user ordering a pizza, via the conversation between the user and digital assistant 206, the digital assistant may guide the user to provide all the requisite information for the pizza order, and then at the end of the conversation cause the pizza to be ordered. Digital assistant 206 may end the conversation by outputting information to the user indicating that the pizza has been ordered.

At a conceptual level, digital assistant 206 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing.

The NLU processing performed by a digital assistant, such as digital assistant 206, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 206 itself. In some other embodiments, digital assistant 206 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 206 is also capable of handling utterances in languages other than English. Digital assistant 206 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 206 depicted in FIG. 2, can be made available or accessible to its users 208 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 2, digital assistant or chatbot system 206 includes skills 216-1, 216-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 202, e.g., through a user interface provided by DABP 202 for registering the skill bot with the digital assistant. In other instances, a skill bot can be developed and created using DABP 202 and then added to a digital assistant created using DABP 202. In yet other instances, DABP 202 provides an online digital store (referred to as a "skills store") that offers multiple skills directed to a wide range of tasks. The skills offered through the skills store may also expose various cloud services. In order to add a skill to a digital assistant being generated using DABP 202, a user of DABP 202 can access the skills store via DABP 202, select a desired skill, and indicate that the selected skill is to be added to the digital assistant created using DABP 202. A skill from the skills store can be added to a digital assistant as is or in a modified form (for example, a user of DABP 202 may select and clone a particular skill bot provided by the skills store, make customizations or modifications to the selected skill bot, and then add the modified skill bot to a digital assistant created using DABP 202).

Various different architectures may be used to implement a digital assistant or chatbot system. For example, in certain embodiments, the digital assistants created and deployed using DABP 202 may be implemented using a master bot/child (or sub) bot paradigm or architecture. According to this paradigm, a digital assistant is implemented as a master bot that interacts with one or more child bots that are skill bots. For example, in the embodiment depicted in FIG. 2, digital assistant 206 comprises a master bot 214 and skill bots 216-1, 216-2, etc. that are child bots of master bot 214. In certain embodiments, digital assistant 206 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 2 shows digital assistant 206 comprising a master bot 214 and skill bots 216-1, 216-2, and 216-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 202 provides an infrastructure and various services and features that enable a user of DABP 202 to create a digital assistant including one or more skill bots associated with the digital assistant. In some instances, a skill bot can be created by cloning an existing skill bot, for example, cloning a skill bot provided by the skills store. As previously indicated, DABP 202 can provide a skills store or skills catalog that offers multiple skill bots for performing various tasks. A user of DABP 202 can clone a skill bot from the skills store. As needed, modifications or customizations may be made to the cloned skill bot. In some other instances, a user of DABP 202 creates a skill bot from scratch using tools and services offered by DABP 202.

In certain embodiments, at a high level, creating or customizing a skill bot involves the following steps:
 (1) Configuring settings for a new skill bot
 (2) Configuring one or more intents for the skill bot
 (3) Configuring one or more entities for one or more intents
 (4) Training the skill bot
 (5) Creating a dialog flow for the skill bot
 (6) Adding custom components to the skill bot as needed
 (7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 202, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot— A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 202 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
 (a) a context section
 (b) a default transitions section
 (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section— A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 202 provides a set of preconfigured components for performing a wide range of functions. A skill bot designer can select one of more of these preconfigured components and associate them with states in the dialog flow for a skill bot. The skill bot designer can also create custom or new components using tools provided by DABP 202 and associate the custom components with one or more states in the dialog flow for a skill bot.

(7) Testing and deploying the skill bot— DABP 202 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 3:
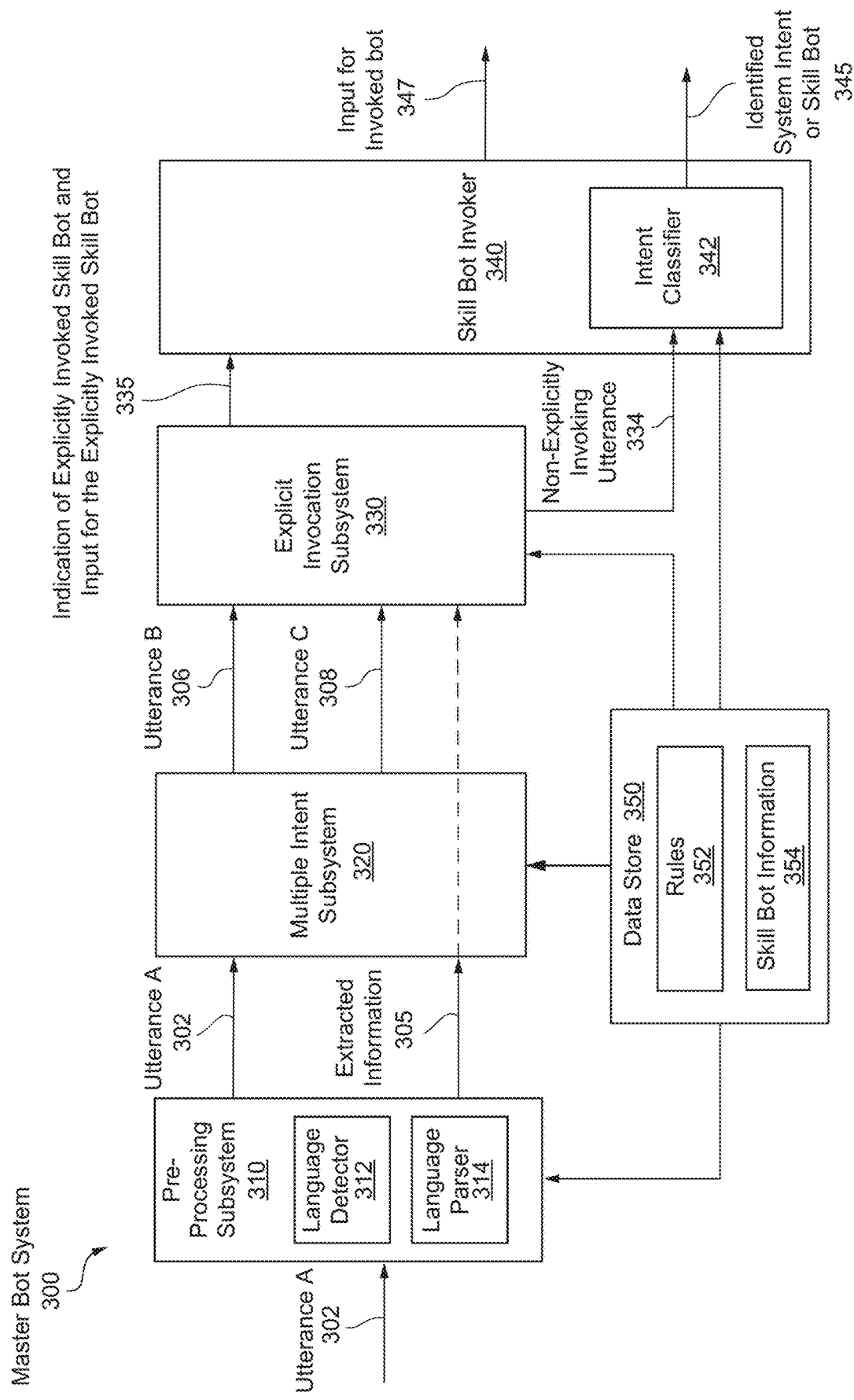
FIG. 3 depicts a simplified block diagram of a computing system implementing a master bot according to certain embodiments.

FIG. 3 is a simplified block diagram of a master bot (MB) system 300 according to certain embodiments. MB system 300 can be implemented in software only, hardware only, or a combination of hardware and software. MB system 300 includes a pre-processing subsystem 310, a multiple intent subsystem (MIS) 320, an explicit invocation subsystem (EIS) 330, a skill bot invoker 340, and a data store 350. MB system 300 depicted in FIG. 3 is merely an example of an arrangement of components in a master bot. One of ordinary skill in the art would recognize many possible variations, alternatives, and modifications. For example, in some implementations, MB system 300 may have more or fewer systems or components than those shown in FIG. 3, may combine two or more subsystems, or may have a different configuration or arrangement of subsystems.

Pre-processing subsystem 310 receives an utterance "A" 302 from a user and processes the utterance through a language detector 312 and a language parser 314. As indicated above, an utterance can be provided in various ways including audio or text. The utterance 302 can be a sentence fragment, a complete sentence, multiple sentences, and the like. Utterance 302 can include punctuation. For example, if the utterance 302 is provided as audio, the pre-processing subsystem 310 may convert the audio to text using a speech-to-text converter (not shown) that inserts punctuation marks into the resulting text, e.g., commas, semicolons, periods, etc.

Language detector 312 detects the language of the utterance 302 based on the text of the utterance 302. The manner in which the utterance 302 is handled depends on the language since each language has its own grammar and semantics. Differences between languages are taken into consideration when analyzing the syntax and structure of an utterance.

Language parser 314 parses the utterance 302 to extract part of speech (POS) tags for individual linguistic units (e.g., words) in the utterance 302. POS tags include, for example, noun (NN), pronoun (PN), verb (VB), and the like. Language parser 314 may also tokenize the linguistic units of the utterance 302 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 314 can perform include chunking of compound expressions, e.g., combining "credit" and "card" into a single expression "credit card." Language parser 314 may also identify relationships between the words in the utterance 302. For example, in some embodiments, the language parser 314 generates a dependency tree that indicates which part of the utterance (e.g. a particular noun) is a direct object, which part of the utterance is a preposition, and so on. The results of the processing performed by the language parser 314 form extracted information 305 and are provided as input to MIS 320 together with the utterance 302 itself.

As indicated above, the utterance 302 can include more than one sentence. For purposes of detecting multiple intents and explicit invocation, the utterance 302 can be treated as a single unit even if it includes multiple sentences. However, in certain embodiments, pre-processing can be performed, e.g., by the pre-processing subsystem 310, to identify a single sentence among multiple sentences for multiple intents analysis and explicit invocation analysis. In general, the results produced by MIS 320 and EIS 330 are substantially the same regardless of whether the utterance 302 is processed at the level of an individual sentence or as a single unit comprising multiple sentences.

MIS 320 determines whether the utterance 302 represents multiple intents. Although MIS 320 can detect the presence of multiple intents in the utterance 302, the processing performed by MIS 320 does not involve determining whether the intents of the utterance 302 match to any intents that have been configured for a bot. Instead, processing to determine whether an intent of the utterance 302 matches a bot intent can be performed by an intent classifier 342 of the MB system 300 or by an intent classifier of a skill bot (e.g., as shown in the embodiment of FIG. 3). The processing performed by MIS 320 assumes that there exists a bot (e.g., a particular skill bot or the master bot itself) that can handle the utterance 302. Therefore, the processing performed by MIS 320 does not require knowledge of what bots are in the chatbot system (e.g., the identities of skill bots registered with the master bot) or knowledge of what intents have been configured for a particular bot.

To determine that the utterance 302 includes multiple intents, the MIS 320 applies one or more rules from a set of rules 352 in the data store 350. The rules applied to the utterance 302 depend on the language of the utterance 302 and may include sentence patterns that indicate the presence of multiple intents. For example, a sentence pattern may include a coordinating conjunction that joins two parts (e.g., conjuncts) of a sentence, where both parts correspond to a separate intent. If the utterance 302 matches the sentence pattern, it can be inferred that the utterance 302 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 302 represents multiple intents, the MIS 320 also determines what portions of the utterance 302 are associated with each intent. MIS 320 constructs, for each intent represented in an utterance containing multiple intents, a new utterance for separate processing in place of the original utterance, e.g., an utterance "B" 306 and an utterance "C" 308, as depicted in FIG. 3. Thus, the original utterance 302 can be split into two or more separate utterances that are handled one at a time. MIS 320 determines, using the extracted information 305 and/or from analysis of the utterance 302 itself, which of the two or more utterances should be handled first. For example, MIS 320 may determine that the utterance 302 contains a marker word indicating that a particular intent should be handled first. The newly formed utterance corresponding to this particular intent (e.g., one of utterance 306 or utterance 308) will be the first to be sent for further processing by EIS 330. After a conversation triggered by the first utterance has ended (or has been temporarily suspended), the next highest priority utterance (e.g., the other one of utterance 306 or utterance 308) can then be sent to the EIS 330 for processing.

EIS 330 determines whether the utterance that it receives (e.g., utterance 306 or utterance 308) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 354 in data store 350. An utterance is deemed to be an explicit invocation when the utterance contains a word match to an invocation name. If a bot is not explicitly invoked, then the utterance received by the EIS 330 is deemed a non-explicitly invoking utterance 334 and is input to an intent classifier (e.g., intent classifier 342) of the master bot to determine which bot to use for handling the utterance. In some instances, the intent classifier 342 will determine that the master bot should handle a non-explicitly invoking utterance. In other instances, the intent classifier 342 will determine a skill bot to route the utterance to for handling.

The explicit invocation functionality provided by the EIS 330 has several advantages. It can reduce the amount of processing that the master bot has to perform. For example, when there is an explicit invocation, the master bot may not have to do any intent classification analysis (e.g., using the intent classifier 342), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 330 is responsible for determining whether any portion of the utterance should be used as input to the skill bot being explicitly invoked. In particular, EIS 330 can determine whether part of the utterance is not associated with the invocation. The EIS 330 can perform this determination through analysis of the utterance and/or analysis of the extracted information 305. EIS 330 can send the part of the utterance not associated with the invocation to the invoked skill bot in lieu of sending the entire utterance that was received by the EIS 330. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 330 may reformat the part to be sent to the invoked bot, e.g., to form a complete sentence. Thus, the EIS 330 determines not only that there is an explicit invocation, but also what to send to the skill bot when there is an explicit invocation. In some instances, there may not be any text to input to the bot being invoked. For example, if the utterance was "Pizza Bot", then the EIS 330 could determine that the pizza bot is being invoked, but there is no text to be processed by the pizza bot. In such scenarios, the EIS 330 may indicate to the skill bot invoker 340 that there is nothing to send.

Skill bot invoker 340 invokes a skill bot in various ways. For instance, skill bot invoker 340 can invoke a bot in response to receiving an indication 335 that a particular skill bot has been selected as a result of an explicit invocation. The indication 335 can be sent by the EIS 330 together with the input for the explicitly invoked skill bot. In this scenario, the skill bot invoker 340 will turn control of the conversation over to the explicitly invoked skill bot. The explicitly invoked skill bot will determine an appropriate response to the input from the EIS 330 by treating the input as a stand-alone utterance. For example, the response could be to perform a specific action or to start a new conversation in a particular state, where the initial state of the new conversation depends on the input sent from the EIS 330.

Another way in which skill bot invoker 340 can invoke a skill bot is through implicit invocation using the intent classifier 342. The intent classifier 342 can be trained, using machine-learning and/or rules-based training techniques, to determine a likelihood that an utterance is representative of a task that a particular skill bot is configured to perform. The intent classifier 342 is trained on different classes, one class for each skill bot. For instance, whenever a new skill bot is registered with the master bot, a list of example utterances associated with the new skill bot can be used to train the intent classifier 342 to determine a likelihood that a particular utterance is representative of a task that the new skill bot can perform. The parameters produced as result of this training (e.g., a set of values for parameters of a machine-learning model) can be stored as part of skill bot information 354.

In certain embodiments, the intent classifier 342 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 342 determines, for each skill bot registered with the master bot, a confidence score indicating a likelihood that the skill bot can handle an utterance (e.g., the non-explicitly invoking utterance 334 received from EIS 330). The intent classifier 342 may also determine a confidence score for each system level intent (e.g., help, exit) that has been configured. If a particular confidence score meets one or more conditions, then the skill bot invoker 340 will invoke the bot associated with the particular confidence score. For example, a threshold confidence score value may need to be met. Thus, an output 345 of the intent classifier 342 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 340 hands over processing to the identified bot. In the case of a system intent, the identified bot is the master bot. Otherwise, the identified bot is a skill bot. Further, the skill bot invoker 340 will determine what to provide as input 347 for the identified bot. As indicated above, in the case of an explicit invocation, the input 347 can be based on a part of an utterance that is not associated with the invocation, or the input 347 can be nothing (e.g., an empty string). In the case of an implicit invocation, the input 347 can be the entire utterance.

Data store 350 comprises one or more computing devices that store data used by the various subsystems of the master bot system 300. As explained above, the data store 350 includes rules 352 and skill bot information 354. The rules 352 include, for example, rules for determining, by MIS 320, when an utterance represents multiple intents and how to split an utterance that represents multiple intents. The rules 352 further include rules for determining, by EIS 330, which parts of an utterance that explicitly invokes a skill bot to send to the skill bot. The skill bot information 354 includes invocation names of skill bots in the chatbot system, e.g., a list of the invocation names of all skill bots registered with a particular master bot. The skill bot information 354 can also include information used by intent classifier 342 to determine a confidence score for each skill bot in the chatbot system, e.g., parameters of a machine-learning model.

Figure 4:
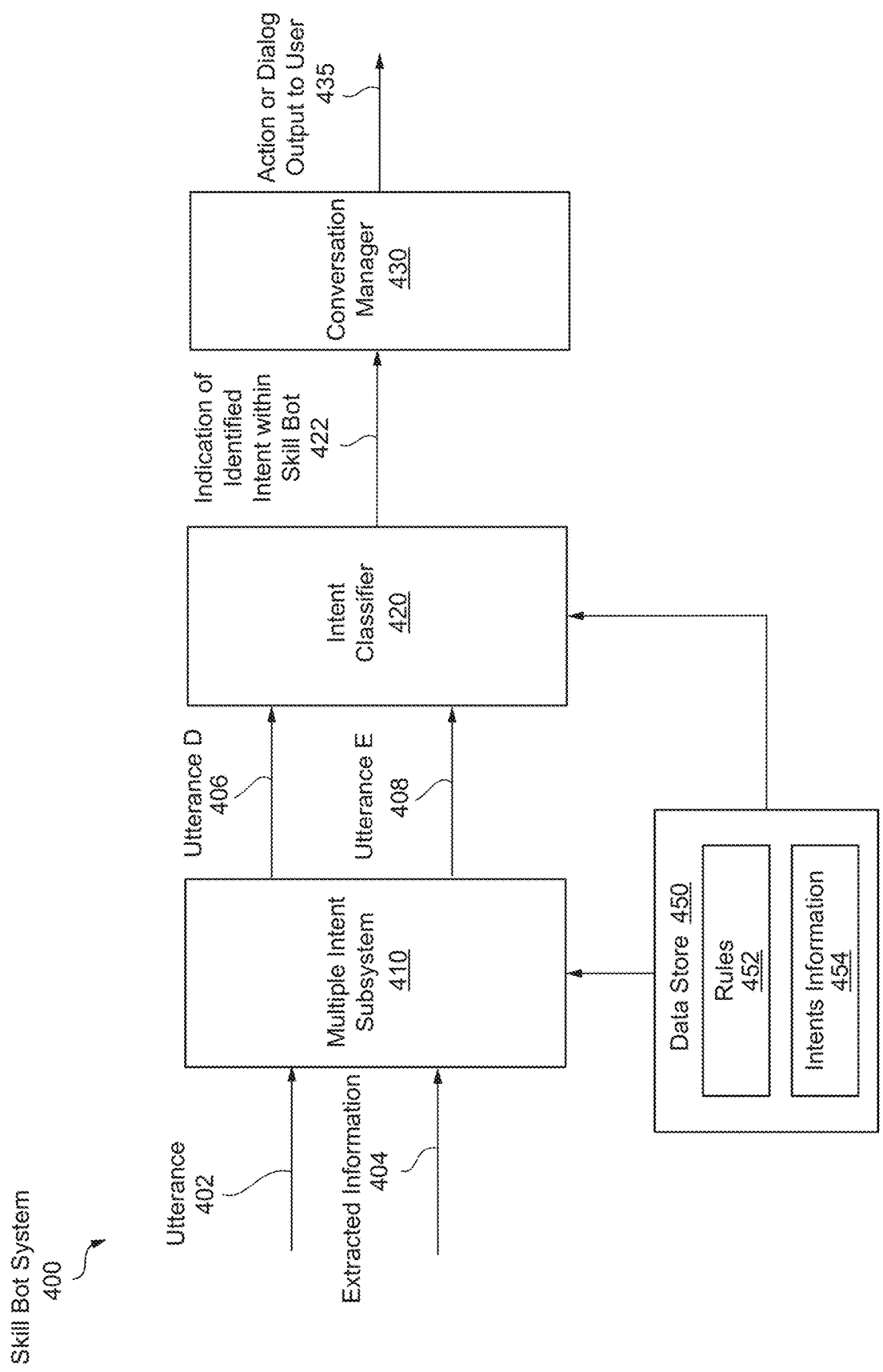
FIG. 4 depicts a simplified block diagram of a computing system implementing a skill bot according to certain embodiments.

FIG. 4 is a simplified block diagram of a skill bot system 400 according to certain embodiments. Skill bot system 400 is a computing system that can be implemented in software only, hardware only, or a combination of hardware and software. In certain embodiments such as the embodiment depicted in FIG. 2, skill bot system 400 can be used to implement one or more skill bots within a digital assistant.

Skill bot system 400 includes an MIS 410, an intent classifier 420, and a conversation manager 430. The MIS 410 is analogous to the MIS 320 in FIG. 3 and provides similar functionality, including being operable to determine, using rules 452 in a data store 450: (1) whether an utterance represents multiple intents and, if so, (2) how to split the utterance into a separate utterance for each intent of the multiple intents. In certain embodiments, the rules applied by MIS 410 for detecting multiple intents and for splitting an utterance are the same as those applied by MIS 220. The MIS 410 receives an utterance 402 and extracted information 404. The extracted information 404 is analogous to the extracted information 205 in FIG. 1 and can be generated using the language parser 214 or a language parser local to the skill bot system 400.

Intent classifier 420 can be trained in a similar manner to the intent classifier 342 discussed above in connection with the embodiment of FIG. 3 and as described in further detail herein. For instance, in certain embodiments, the intent classifier 420 is implemented using a machine-learning model. The machine-learning model of the intent classifier 420 is trained for a particular skill bot, using at least a subset of example utterances associated with that particular skill bot as training utterances. The ground truth for each training utterance would be the particular bot intent associated with the training utterance.

The utterance 402 can be received directly from the user or supplied through a master bot. When the utterance 402 is supplied through a master bot, e.g., as a result of processing through MIS 320 and EIS 330 in the embodiment depicted in FIG. 3, the MIS 410 can be bypassed so as to avoid repeating processing already performed by MIS 320. However, if the utterance 402 is received directly from the user, e.g., during a conversation that occurs after routing to a skill bot, then MIS 410 can process the utterance 402 to determine whether the utterance 402 represents multiple intents. If so, then MIS 410 applies one or more rules to split the utterance 402 into a separate utterance for each intent, e.g., an utterance "D" 406 and an utterance "E" 408. If utterance 402 does not represent multiple intents, then MIS 410 forwards the utterance 402 to intent classifier 420 for intent classification and without splitting the utterance 402.

Intent classifier 420 is configured to match a received utterance (e.g., utterance 406 or 408) to an intent associated with skill bot system 400. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 420 can be trained to determine a confidence score for each intent associated with the skill bot system 400. Whereas the classification performed by intent classifier 342 is at the bot level, the classification performed by intent classifier 420 is at the intent level and therefore finer grained. The intent classifier 420 has access to intents information 454. The intents information 454 includes, for each intent associated with the skill bot system 400, a list of utterances that are representative of and illustrate the meaning of the intent and are typically associated with a task performable by that intent. The intents information 454 can further include parameters produced as a result of training on this list of utterances.

Conversation manager 430 receives, as an output of intent classifier 420, an indication 422 of a particular intent, identified by the intent classifier 420, as best matching the utterance that was input to the intent classifier 420. In some instances, the intent classifier 420 is unable to determine any match. For example, the confidence scores computed by the intent classifier 420 could fall below a threshold confidence score value if the utterance is directed to a system intent or an intent of a different skill bot. When this occurs, the skill bot system 400 may refer the utterance to the master bot for handling, e.g., to route to a different skill bot. However, if the intent classifier 420 is successful in identifying an intent within the skill bot, then the conversation manager 430 will initiate a conversation with the user.

The conversation initiated by the conversation manager 430 is a conversation specific to the intent identified by the intent classifier 420. For instance, the conversation manager 430 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 430 can determine an action/dialog 435 upon receiving the indication 422 identifying the intent, and can determine additional actions or dialog in response to subsequent utterances received during the conversation.

Data store 450 comprises one or more computing devices that store data used by the various subsystems of the skill bot system 400. As depicted in FIG. 4, the data store 450 includes the rules 452 and the intents information 454. In certain embodiments, data store 450 can be integrated into a data store of a master bot or digital assistant, e.g., the data store 250 in FIG. 2.

Routing Behavior for Digital Assistants and Skill Bots

When a user inputs a phrase into the digital assistant (or the master bot), the digital assistant determines how to route the conversation, whether to a given skill, to a different state in the current flow, or to a built-in intent for the digital assistant, as described with respect to FIGS. 2-4. At the core of the routing model are confidence scores, which are calculated for the individual skills and intents to measure how well they match with the user's input (e.g., provide information about the reliability of predictions). Confidence scores are derived by applying the underlying natural language processing (NLP) algorithms to the input data (e.g., utterances) for the skills and digital assistant. The confidence scores may be derived using any confidence measurement technique or estimator (e.g., Bayesian models, distance-based loss, adversarial training, and the like). For example, in classification, the confidence of individual predictions may already be estimated as part of the classification. Intuitive estimation approaches use the uncertainty between classes, expressed by the posterior probability or the distance to a separating hyperplane, to assess the different nature of individual predictions. In contrast, confidence estimators for regression may utilize properties of the training data or characteristics of the machine learning model. Routing decisions are then made by measuring the confidence scores against the values of various routing parameters, such as Candidate Skills Confidence Threshold and Confidence Win Margin, and optionally applying one or more rules to the routing.

For example with respect to resolving intents, a machine-learning model associated with a skill may evaluate a user message and returns a confidence score for what the model determines is a top-level label (intent) and the runners-up. In a conversational context (e.g., conversational AI), the top-level label is resolved as the intent to start a conversation with the user. So, based on the model training and the user message, take for instance one case where the model has 80% confidence that Intent A is a good match, 60% confidence for Intent B, and 45% for Intent C. In this case, the model would probably be pretty comfortable that the user wants Intent A. But what if the highest scoring label has only 30% confidence that this is what the user wants? Would a developer risk the model to follow this intent, or would the developer rather play it safe and assume the model can't predict what a user would want (unresolved intent) and/or display a message to the user to rephrase a request. To help the intent model make a decision about what intents to consider matching with a user utterance, in the conversational context the digital assistant uses a setting called the confidence threshold. The intent model evaluates a user utterance against all intents and assigns confidence scores for each intent. The confidence threshold is a value within the range of possible confidence scores that marks the line: below which an intent is considered to not correspond at all with the utterance; and, above which an intent is considered to be a candidate intent for starting a conversation. Although this example is specific to resolving intents it should be understood that confidence scores can be derived and used for resolving various types of inferences by the digital assistant such as which skill to use for processing a message/utterance.

The routing model comprises three layers: Determine candidate system intents (e.g., using a candidate system intent model), Determine candidate skills (e.g., using a candidate skills model), and Determine candidate flows (e.g., using a the candidate flows model). With respect to Determine candidate system intents: The user input is evaluated and confidence scores are applied to the digital assistant's intents (exit, help, and unresolved intent (unresolvedIntent)). Any of these intents that have confidence scores exceeding the value of the digital assistant's Built-In System Intent Confidence Threshold routing parameter are treated as candidates for further evaluation. With respect to Determine candidate skills: The user input is evaluated and confidence scores are applied to each skill. Any skills that have confidence scores exceeding the value of the digital assistant's Candidate Skills Confidence Threshold routing parameter are treated as candidate skills for further evaluation. With respect to Determine candidate flows: After the candidate skills are identified, each intent in those skills are evaluated (according to the intent model for each skill) and confidence scores are applied to each intent. In general, any intent that has a confidence score exceeding the value of its skill's Confidence Threshold routing parameter (not the digital assistant's Candidate Skills Confidence Threshold parameter) is treated as a candidate flow.

The behavior of this routing may be tuned by adjusting the digital assistant's routing parameters. Depending on the composition of skills (and their intents) in a digital assistant, a user may need to adjust the values of the digital assistant's routing parameters to better govern how the digital assistant responds to user input. Routing parameters may be configured to take values from 0 (0% confidence) to 1 (100% confidence). Follows is a summary of possible digital assistant routing parameters:

Built-In System Intent Confidence Threshold: The minimum confidence score required for matching built-in system intents, like help and exit. The default value may be for example 0.9 (90% confidence).

Candidate Skills Confidence Threshold: The minimum confidence score required to a match a candidate skill. The default value may be for example 0.4 (40% confidence).

Confidence Win Margin: The maximum difference between the confidence score of the top candidate skill and the confidence scores of any lower ranking candidate skills (that also exceed the confidence threshold) for those lower ranking candidate skills to be considered. The built-in digital assistant intents (help, exit, and unresolvedIntent) may also be considered. The default value may be for example 0.1 (10% confidence). There is a separate Confidence Win Margin parameter for skills that works the same way, except that it applies to confidence scores of intents within the skill.

Consider All Threshold: The minimum confidence score required to consider all the matching intents and flows. This value also takes precedence over win margin. (If there is such high a confidence that there is no way to know for sure which flow user wants to use.) The default value may be for example 0.8 (80% confidence).

Consider Only Current Context Threshold: The minimum confidence score required when considering only the current skill. If user input matches an intent above this threshold, other intents are not considered even if they reach the confidence threshold. This setting is useful for preventing disambiguation prompts for user input that matches well with intents from multiple skills. For example, the user input "cancel order" could match well with intents in multiple food delivery skills. The default value may be for example 0.8 (80% confidence).

Explicit Invocation Confidence Threshold: The minimum confidence score required for matching with input that contains explicit invocation of the skill. The default value may be for example 0.8 (80% confidence).

Exit Prompt Confidence Threshold: The minimum confidence score required for exiting without prompting the user for confirmation. The default value may be for example 1.01, which is nominally set outside of the 0 to 1 range for confidence thresholds, and ensures that a confirmation prompt will always be displayed. However, if a skill designer wants the user to be able to exit without a confirmation prompt when the confidence score for exiting is high, this threshold can be lowered.

In addition to the digital assistant routing parameters, behavior of the routing may be further tuned by adjusting the skill routing parameters. Follows is a summary of possible skill routing parameters:

Confidence Threshold: The minimum confidence score required to match a skill's intent with user input. If there is no match, the transition action is set to unresolved intent. The default value may be for example 0.7 (70% confidence).

Confidence Win Margin: Only the top intent that exceeds the confidence threshold is picked if it is the highest ranking intent which exceeds the confidence threshold. If other intents that exceed the confidence threshold have scores that are within that of the top intent by less than the win margin, these intents are also presented to the user. The default value may be for example 0.1 (10% confidence).

In addition, rules may be generated for various cases that affect the routing formula. For example, rules may include: Explicit invocation, Context-aware routing, and Context pinning With respect to Explicit invocation: If a user includes the invocation name of a skill in their input, the digital assistant will route directly to that skill, even if the input also matches well with other skills. With respect to Context-aware routing, if a user is already engaged with a skill, that skill is given more weight during intent resolution than intents from other skills. With respect to Context pinning: If the user input includes an explicit invocation for a skill but no intent-related utterance, the router "pins" the conversation to the skill. That means that the next utterance is assumed to be related to that skill.

Explicit invocation occurs when a user enters the invocation name for a skill as part of their input. By using explicit invocation, the user helps ensure that their input is immediately routed to the intended skill, thus reducing the number of exchanges with the digital assistant necessary to accomplish their task. When explicit invocation is used, extra weight is given to the corresponding skill when determining the routing: If the user is not already in a skill and enters an explicit invocation, that invocation takes precedence over other flows in the digital assistant context. If the user is in a flow for a different skill, the digital assistant will always try to confirm that the user really wants to switch skills. In each digital assistant, a user such as a skill developer can determine the invocation name they want to use for a given skill. The user may set the invocation name on the skill's digital assistant configuration page. This behavior may be supported by the Explicit Invocation Confidence Threshold routing parameter. If the confidence score for explicit invocation exceeds that threshold, intents from other skills are not taken into account in the routing decision. In some instances, the default value for this threshold is set at 0.8 (80% confidence).

Routing in digital assistants is also context aware, which means that matching intents from the skill that the user is currently engaged with are given more weight than intents from other skills during intent resolution. For example, consider a digital assistant has a banking skill and a skill for an online retail shop. If a user inputs the question "What's my balance?", this could apply to both the user's bank account balance and the balance remaining on a gift card that is registered with the online retailer. If the user such as a customer enters this question before entering the context of either skill, the digital assistant should give them a choice of which "balance" flow to enter (either in the banking skill or the retailer skill). However, if the user enters this question from within the banking skill, the digital assistant should automatically pick the "balance" flow that corresponds to the banking skill (and disregard intents from other skills, even if they meet the standard Confidence Threshold routing parameter). Context awareness is supported by the Consider Only Current Context Threshold routing parameter. If the confidence score for an intent in the current context exceeds that threshold, intents from other contexts are not taken into account in the routing decision. In some instances, the default value for this threshold is 0.8 (80% confidence), since a user probably wants to be pretty certain that an intent in the current context is the right one before they rule out displaying other intents outside the current context.

In addition to the intents from the skill that the user is currently engaged there are intents common to multiple or all skills such as help or unresolved intents. For example, within the context of a skill, if user input is matched to the help system intent, the user is routed to a help flow determined by that skill (not to a flow determined at the digital intent level). More specifically, if a user is engaged with a skill and types help, help for that skill will be provided, not help for the digital assistant as a whole. For the unresolved intent system intent, the behavior is different. If the user input resolves to unresolved intent (and there are no other matching intents in the skill), the input is treated as an unresolved intent at the digital assistant level. However, if unresolved intent is just one of the matching intents within the skill, the skill handles the response. This behavior is supported by the Built-In System Intent Confidence Threshold routing parameter. If the confidence score for one of these intents exceeds that threshold, that intent is treated as a candidate for further evaluation. In some instances, the default value for this threshold is 0.9 (90% confidence).

As discussed herein, giving more weight to matching intents from the skill that the user is currently engaged with than intents from other skills during intent resolution can result in improper routing, especially for OOS utterances. It is important for a chatbot system to be able to identify such OOS utterances such that proper responsive actions can be taken. Consequently, in accordance with aspects of the present disclosure, context awareness may also take skill groups into account. This means that when a skill is defined as being part of a skill group and that skill is in the current context, the current context also includes the other skills in that skill group. As discussed herein, for skill domains that encompass a lot of functionality, it's often desirable to divide that functionality into multiple specialized skills. This is particularly useful from a development perspective. Different teams can work on different aspects of the functionality and release the skills and their updates on the timelines that best suit them. When there are multiple skills in a domain, it is likely that users such as customers will need to switch between those skills relatively frequently. For example, in a single session in a digital assistant that contains several HR-related skills, a user may make requests related to skills for compensation, personal information, and vacation time. To optimize routing behavior among related skills, a user such as a skill developer can define a skill group. Within a digital assistant, all of the skills within a group are treated as a single, logical skill. As a result, all of the skills in the group are considered part of the current context, so all of their intents are weighted equally during intent resolution.

When skill groups are defined for a digital assistant, the routing engine keeps track of both the skill context and the group context. The routing engine switches the skill context within a group if it determines that another skill in the group is better suited to handle the user request. This determination is based on the group's skills ranking in the candidate skills model. In some instances, if the confidence score of the group's top candidate skill is less than 5% higher than that of the current skill, the skill context in the group is not changed.

In order to delineate skill groups, each skill group should be defined as a collection of skills within the same domain that have a linguistic kinship. The skills within the group should be divided by function. For example, it might make sense to assemble skills for Benefits, Compensation, Absence, Personal Information, and Hiring into an HCM skill group. Skills for Opportunities and Accounts could belong to a Sales skill group. Skills may be associated with a group using an identifier of the group such as a name or label of the group. In some instances, to organize skill groups and prevent naming collisions, a user may use the <company name>.<domain> pattern for the names of the skill groups. For example, a user might create a group called acme.hcm for the following HCM skills for a hypothetical Acme corporation.

Benefits
Compensation
Absence
Personal Information
Hiring

Likewise, if the hypothetical Acme also has the following skills that are in the sales domain, a user could use acme.sales as the skill group:

Opportunities
Accounts

If a developer wants to develop a digital assistant that has common skills for functions like help or handling small talk, the developer may not want to treat the common skills as a separate group of skills since they might be invoked at any time in the conversation, no matter which group of skills a user is primarily interacting with. And once invoked, the developer may want to make sure that the user doesn't get stuck in these common skills. To ensure that other groups of skills are given the same weight as a common skill after an exchange with the common skill is finished, the developer may include the common skill in a group of groups. The developer may do so by including the asterisk (*) or wildcard in the group name of the common skill. For example: If the developer uses acme.* as the skill group name, any skills in the acme.hcm and acme.sales groups would be included, but any skill in a group called hooli.hcm would not be included. Alternatively, if the developer uses * as the skill group name, all groups would be included (though not any skills that are not assigned to a group). When a user navigates from a skill in a simple group (a group that doesn't have an asterisk in its name) to a skill with an asterisk or wildcard in its group name, the group context will stay the same as the group context before navigating to this skill. For example, if a user's conversation moves from a skill in the acme.hcm group to a skill in the acme.* group, the group context will remain acme.hcm.

Continuing with the example of user created groups above, follows are examples of context awareness and routing within and between skill groups:

A user asks, "What benefits do I qualify for?" The skill context is the Benefits skill and the group context is acme.hcm. The user then asks, "What is my salary?" The skill context is changed to Compensation and the groups context remains acme.hcm.

A user's current context is the Benefits skill, which means that their current group context is acme.hcm. The user asks, "What sales opportunities are there?" This request is out of domain for not only the current skill, but for all of the skills in the HCM group (though "opportunities" may offers a potential match for the Hiring skill). The user is routed to the top match, Opportunities, which is in the acme.sales group context.

A user enters "what are my benefits", which invokes the Benefits skill that's part of the acme.hcm group.

The user's context is the Benefits skill and the acme.hcm group.

The user enters "Tell me a joke", which invokes the generic ChitChat skill that is assigned the acme.* group.

The user is now in the ChitChat skill context. The group context is now any group that matches acme.*. This includes both acme.hcm (which includes the previously invoked Benefits skill) and also acme.sales, which is made of the Opportunities and Accounts skills.

The user asks "what are my benefits?" and follows that with "I have another question."

The user is in the acme.hcm context because they were previously in that context because of question about benefits, but has now been routed to the misc.another-.question intent in the Miscellaneous skill, which is a member of the acme.*group.

When a user navigates to a skill belonging to a group name that includes the asterisk (*), the user group context remains the same (such as acme.hcm in this example) before getting routed to the skill that belongs to a * group.

The user is currently in the context of skill called Miscellaneous, which provides common functions. It belongs to the acme.*group, which means that user's current group context is all acme groups (acme.sales and acme.hcm). The current skill context is Miscellaneous. The user enters "What benefits do I qualify for?" The current skill context changes to Benefits, which belongs to the acme.hcm group.

Figure 5A:
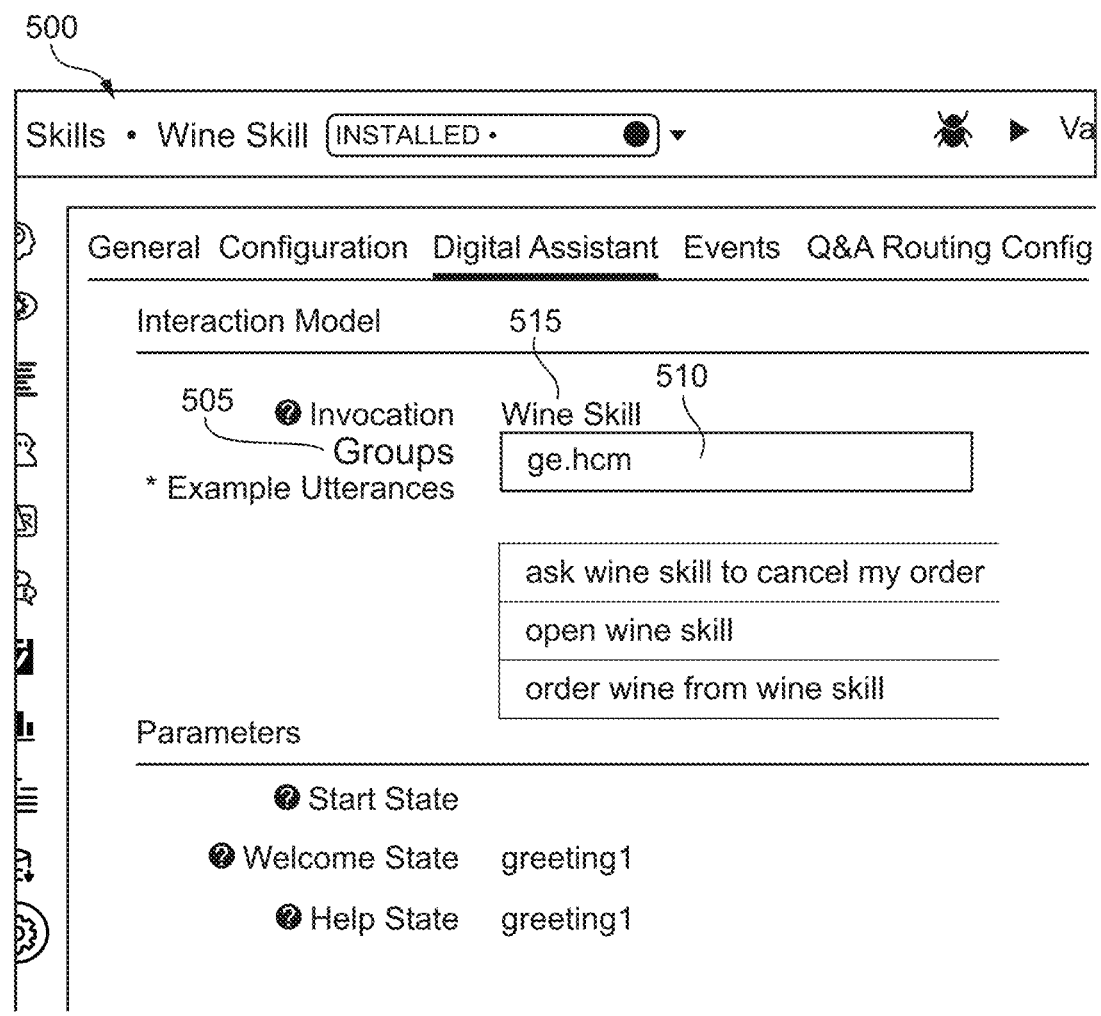
FIGS. 5A and 5B depict graphical user interfaces in accordance with various embodiments.
Figure 5B:
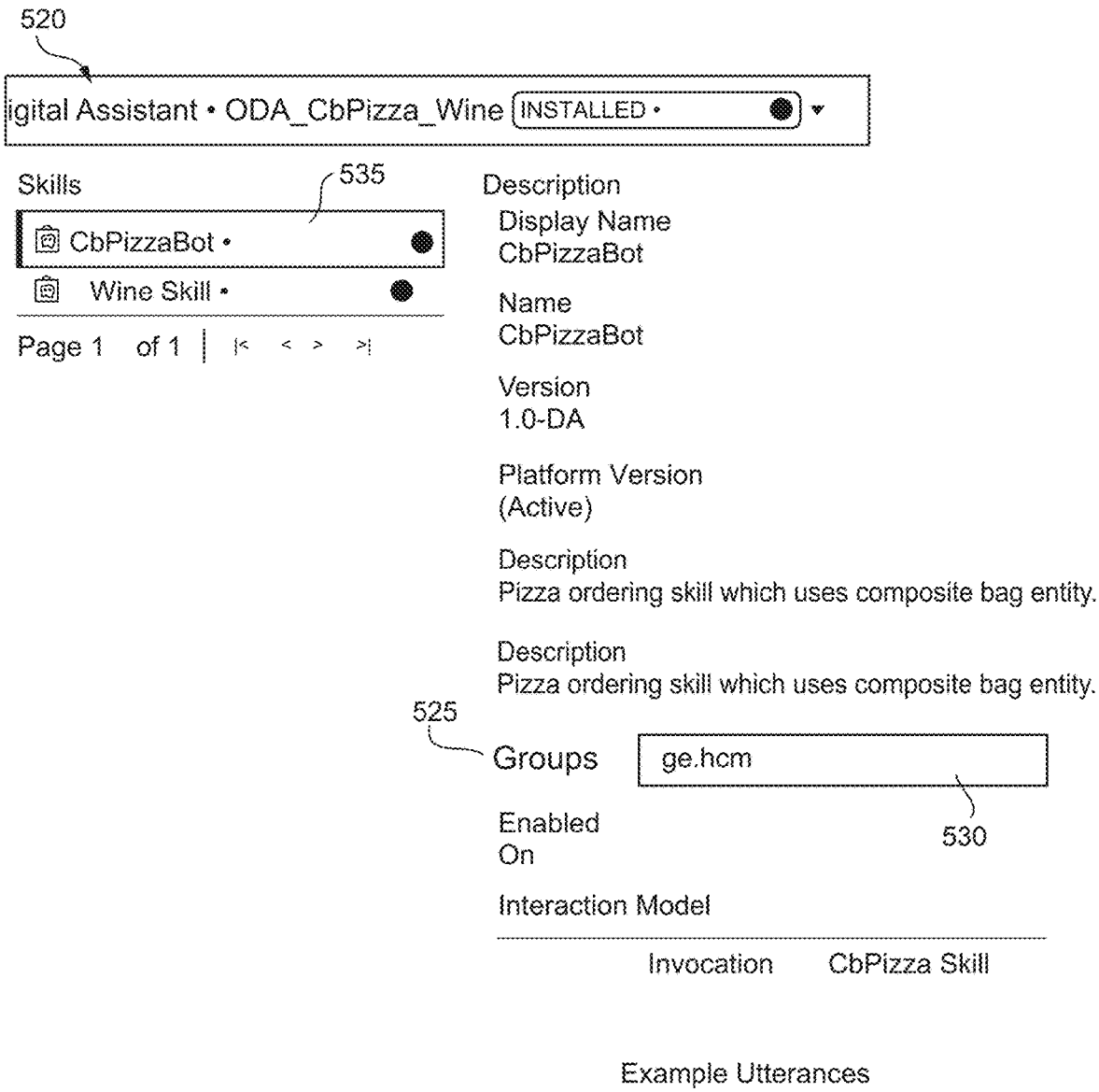

As shown in FIG. 5A, in order to define a skill group for a skill, a user such as a skill developer can navigate a graphic user interface 500 of a skill's configuration page and enter a group name 505 in the Group field 510 of the skill 515. Once the skill 515 is added to a digital assistant, any other skill in the digital assistant with that group name 505 will be considered a part of the same skill group. If the skill has been already added to a digital assistant, a user can set the skill group (or override the group that was designated in the skill's settings) in the digital assistant. As shown in FIG. 5B, in order to set a skill group in the digital assistant, the user can navigate a graphic user interface 520 of a digital assistant configuration page and enter a group name 525 in the Group field 530 for a skill 535.

Routing in digital assistants may also be based on context pinning. If the user input includes an explicit invocation for a skill but no intent-related utterance, the router "pins" the conversation to the skill for the next piece of user input. That means that the next utterance is assumed to be related to that skill, so the router doesn't consider any intents from different skills. If the user then enters something that doesn't relate to that skill, the router treats it as an unresolved intent within the skill, even if it would match well with an intent from a different skill. (The exit intent is an exception. It is always taken into account.) After that, it removes the pin. So if the user then repeats that input or enters something else unrelated to the pinned context, all flows again are taken into account.

Consider this example of how routing based on context pinning works when the user behaves as expected:

The user enters "Go to Pizza Skill", which is an explicit invocation of Pizza Skill. (Including the skill's name in the utterance makes it an explicit invocation.)

At this point, the conversation is pinned to Pizza Skill, meaning that the digital assistant will only look for matches in Pizza Skill.

She then enters "I want to place an order".

The digital assistant finds a match to the OrderPizza intent in Pizza Skill and begins the flow for ordering a pizza.

At this point, the pin is removed.

And follows is an example of how routing based on context pinning works should work when the user proceeds in a less expected manner:

The user enters "Go to Pizza Skill", which is an explicit invocation of Pizza Skill.

At this point, the conversation is pinned to Pizza Skill.

She then enters "transfer money".

This input doesn't match anything in Pizza Skill, so the router treats it as an unresolved intent within Pizza Skill (and, depending on the way the flow for unresolved intent is designed, the user is asked for clarification). Intents from other skills (such as Financial Skill) are ignored, even if they would provide suitable matches.

The pin from Pizza Skill is removed.

She repeats her request to transfer money.

A match is found in Financial Skill, and the transfer money flow is started.

FIG. 6 shows an example 600 of a digital assistant evaluating a user's input and routing the conversation to a specific flow. In this example, a user provides the input/utterance "order pizza", and the digital assistant's initial response is "How old are you?". The response from the digital assistant "How old are you?" indicates the start of the Pizza Skill's OrderPizza flow (which requires the user to be 18 or over to order a pizza). As shown in FIG. 6, the digital assistant found that there was a strong match for Pizza Skill (100%) and a weak match for Retail Skill (21.56%). At the first layer 605—Determine candidate system intents, there were no matches for any system intents. At the second layer 610—Determine candidate skills, there was a strong match for Pizza Skill (100%) and a weak match for Retail Skill (21.56%). Since the match for Pizza Skill exceeded the Candidate Skills Confidence Threshold (40%), the digital assistant evaluated flows in Pizza Skill. As explained herein, a skill designer can adjust the value of the Candidate Skills Confidence Threshold in the digital assistant's configuration settings. At the third layer 615—Determine candidate flows, in Pizza Skill, the digital assistant found one match for the intent to Order Pizza. Since that match exceeded the confidence threshold for flows in Pizza Skill (and there were no other qualifying matches to consider), the Order Pizza flow was started.

FIG. 7 shows an example 700 when the user needs to be prompted to clarify their intent. In this example, a user provides the input/utterance "what is my balance", and the digital assistant's initial response is "Do you want to go to: Gift Card Balances, Balances in Financial Account, or None of the Above". As should be understood, the digital assistant is unsure of what the user wants to do, so it provides a prompt asking the user to choose among a few options (disambiguate). As shown in FIG. 7, at the first layer 705—Determine candidate system intents, there were no matches for any system intents. At the second layer 710—Determine candidate skills, both the Fin Skill and Retail Skill candidate skills got high scores (100%). And then for each of those skills, at the third layer 615—Determine candidate flows, the digital assistant identified a candidate flow that also scored highly (also 100%). Since the Gift-CardBalance and Balances candidate flows exceed the confidence threshold, and since difference between their scores is less than the Confidence Win Margin value (10%), the digital assistant asks the user to choose between those intents.

FIG. 8 shows an example 800 where application of a rule affects routing behavior. In this example, a user provides the input/utterance "what is my balance", and the digital assistant's initial response is "Do you want to go to: Gift Card Balances, Balances in Financial Account, or None of the Above". As should be understood, the digital assistant is unsure of what the user wants to do, so it provides a prompt asking the user to choose among a few options (disambiguate). In response, the user requests "Balances in financial account," and again the digital assistant responds with a prompt asking the user to choose among a few options including savings, checking, and credit card. In response, the user requests "checking," and the digital assistant responds with the balance in the user's checking account. Thereafter, the user requests "now check balance for a gift card," and the digital assistant responds with "What is your gift card number?". In this case, the user has started using the digital assistant to check for their financial account balance in Financial Skill but then decides to ask for the balance for their gift card in Retail Skill. Since she uses explicit invocation (calling it by its invocation name, which is also gift card or Retail Skill, and which is set on the page for the skill within the digital assistant), the digital assistant gives preference to the Retail Skill when trying to resolve the intent, even though the user is in the context of the Financial Skill. The routing rule being applied here is an explicit invocation—where If a user includes the invocation name of a skill in her input, the digital assistant will route directly to that skill, even if the input also matches well with other skills. As shown in FIG. 8, there is a match for the current context 805, but it is ignored. The match for explicit invocation 810 of the Retail Skill's GiftCardBalance (100%) wins.

FIG. 9 shows an example 900 where context awareness affects routing behavior. In this example, a user provides the input/utterance "what is my balance", and the digital assistant's initial response is "Do you want to go to: Gift Card Balances, Balances in Financial Account, or None of the Above". As should be understood, the digital assistant is unsure of what the user wants to do, so it provides a prompt asking the user to choose among a few options (disambiguate). In response, the user requests "Balances in financial account," and again the digital assistant responds with a prompt asking the user to choose among a few options including savings, checking, and credit card. In response, the user requests "checking," and the digital assistant responds with the balance in the user's checking account. Thereafter, the user requests "what is my balance," and again the digital assistant responds with a few options including savings, checking, and credit card. In this case, the user starts with the question "what's my balance", goes through a prompt to disambiguate between the Financial Skill and Retail skill, and eventually gets their checking account balance. Then they enter "what is my balance" again, but this time doesn't have to navigate through any disambiguation prompt to distinguish between the Financial Skill and Retail skill. The info in the routing table shown in FIG. 9 explains how current context may be set by a context aware router and used to avoid some prompts to disambiguate. The current context rule being applied is—if a current context flow matches with very high confidence, other skill flows are ignored. So, even though there are matching intents from the Retail skill 905, they are ignored. The intent calls section shows all of the matching intents, but the entry set by the context aware router for "Current Context" 910, which contains only the Fin Skill's Balances intent 915, is decisive.

FIGS. 10A-10C show an example 1000 where context awareness takes skill groups into account and affects routing behavior. Firstly, FIG. 10A shows a routing rules section 1005 where a routing rule 1010 is output when a change in skill context is made due to group stickiness. The original rule "consider flows from all models" changes to "current context is switched upon a change in skill context to highest confidence in skill group" and "current context flows matches with very high confidence. Other skill are ignored" upon a change in skill context due to skill grouping assignments. Secondly, FIG. 10B shows that the routing intent calls section and routing table are updated to display the group context 1015 assigned for skill intent output including current context 1020 and candidate flow models 1025. In some instance, group context 1015 is also shown in 'Current Context' row, as the group context can be different from skill group (e.g., when routing to common skills that belong to multiple groups). Lastly, FIG. 10C shows a routing summary row 1030 where the group context 1015 displayed after the flow 1035 to route to is chosen by the digital assistant.

It will be appreciated that a skill as described herein can equivalently be expressed as a classifier trained to specialize in processing of a certain type of natural language input, viz. input relating to the specific area or domain of the skill. The candidate skills model discussed above therefore acts as a classifier selection mechanism for identifying a classifier that is best suited to recognizing an utterance and to generate an appropriate output, e.g. a text output or a speech output. The candidate skills model when deployed as described herein may thus provide an improved speech recognition tool as it selects a domain-expert classifier (skill) trained specifically to analyze the input speech or text in the domain recognized by the candidate skills model. In an embodiment the utterance is in audio format, e.g. an audio file containing speech, such that the candidate skills model can act to improve speech recognition as it can better map the speech input to a text output—this text output being the textual response provided by the skill (classifier) selected by the candidate skills model. Similar advantages can be realized with textual input.

Illustrative Use Cases and Techniques for Context Aware Routing with Skill Groups For the following use cases it is assumed that in the digital assistant configuration page, if an Entity_1 has skills in HCM, Sales and the common domain then a skill developer may specify each group that a skill can belong to as follows:
HCM Domain skills will specify 'Entity_1.hcm' group label for below skills
Benefits
Compensation
Absence
Personal Information
Hiring
Sales domain skills will specify 'Entity_1.sales' group label for below skills
Opportunities
Accounts
Common skills to be part of all Entity_1 groups will have ('Entity_1.*') label for below skills. If '*' is specified the skill will be part of all groups.
System
Chit-Chat In a first use case, a user is in a benefits skill and provides the input/utterance "What was my salary last year?" (i.e., a compensation skill input), and a context aware router of the digital assistant has set current skill context to 'benefits' and the group context as 'Entity_1.hcm'. At the first layer—Determine candidate system intents, the candidate system intent model of the digital assistant determines no matches for any system intents. At the second layer—Determine candidate skills, the candidate skills model of the digital assistant will rank the compensation skill higher than benefits skill. In response, the context aware router of the digital assistant sets current skill context to 'compensation' and maintains the group context as 'Entity_1.hcm'. And then for the candidate skill, at the third layer—Determine candidate flows, the candidate flows model identifies a candidate flow (i.e., intent) within the current skill context and group context that scored highly, i.e., the flow for obtaining salary.

In a second use case, a user is in a benefits skill and provides the input/utterance "What sales opportunities are there?" (i.e., a opportunities skill input), and a context aware router of the digital assistant has set current skill context to 'benefits' and the group context as 'Entity_1.hcm'. At the first layer—Determine candidate system intents, the candidate system intent model of the digital assistant determines no matches for any system intents. At the second layer—Determine candidate skills, the candidate skills model of the digital assistant will identify the utterance for opportunity as being out of domain (specifically, out of scope) for the benefits skill and the group of skills that fall under the group 'Entity_1.hcm'. Once the current skill and group context are excluded from contention, the candidate skills model will identify the opportunities skill as being the highest ranked skill. In response, the context aware router of the digital assistant sets current skill context to 'opportunity' and changes the group context to 'Entity_1.sales'. And then for the candidate skill, at the third layer—Determine candidate flows, the candidate flows model identifies a candidate flow (i.e., intent) within the current skill context and group context that scored highly, i.e., the flow for providing sales opportunities available.

In a third use case, a user is in a system skill and provides the input/utterance "What benefits do I qualify for?" (i.e., a benefits skill input), and a context aware router of the digital assistant has set current skill context to 'system' and the group context as 'Entity_1.*='Entity_1.hcm', 'Entity_1.sales'. At the first layer—Determine candidate system intents, the candidate system intent model of the digital assistant determines no matches for any system intents. At the second layer—Determine candidate skills, the candidate skills model of the digital assistant will rank the benefits skill higher than any of the system skills. In response, the context aware router of the digital assistant sets current skill context to 'benefits' and changes the group context to 'Entity_1.hcm'. And then for the candidate skill, at the third layer—Determine candidate flows, the candidate flows model identifies a candidate flow (i.e., intent) within the current skill context and group context that scored highly, i.e., the flow for providing qualifying benefits.

In a fourth use case, a user is in a benefits skill and provides the input/utterance "Can I get a telephone number for ABC?" (where ABC is an account name, but this can match 'personal information'), and a context aware router of the digital assistant has set current skill context to 'benefits' and the group context as 'Entity_1.hcm'. At the first layer—Determine candidate system intents, the candidate system intent model of the digital assistant determines no matches for any system intents. At the second layer—Determine candidate skills, the candidate skills model of the digital assistant will identify the top two matches as the accounts skill and personal information skill, which are within the win margin parameter. The candidate skills model will rank personal information skill higher because it provides deference to skills within the current group context, Entity_1.hcm, and the context aware router of the digital assistant will maintain the group context as 'Entity_1.hcm. And then for the candidate skill, at the third layer—Determine candidate flows, the candidate flow model will identify a disambiguation flow (i.e., intent) to prompt a user and distinguish between the accounts skill and personal information skill given that they both ranked within the win margin parameter.

In a fifth use case, a user is in a personal information skill and provides the input/utterance "Can I get a telephone number for ABC?" (where ABC is an account name, but this can match 'personal information'), and a context aware router of the digital assistant has set current skill context to 'personal information' and the group context as 'Entity_1.hcm'. At the first layer—Determine candidate system intents, the candidate system intent model of the digital assistant determines no matches for any system intents. At the second layer—Determine candidate skills, the candidate skills model of the digital assistant will identify the top two matches as the accounts skill and personal information skill, which are within the win margin parameter. However, in this instance, the personal information match is >0.8, and thus more than a current context only threshold parameter. The candidate skills model is ignored, and the context aware router of the digital assistant will maintain the skill context as 'personal information' and the group context as 'Entity_1.hcm. And then for the candidate skill, at the third layer—Determine candidate flows, the candidate flows model identifies a candidate flow (i.e., intent) within the current skill context and group context that scored highly, i.e., the flow for providing telephone number under personal information. Note in this instance the user does not get what they intended to get—the utterance 'Can I get phone number for ABC account?' would have worked better.

In a sixth use case, a user is in a personal information skill and provides the input/utterance "Can I get a telephone number for ABC?" (where ABC is a person's name), and a context aware router of the digital assistant has set current skill context to 'personal information' and the group context as 'Entity_1.hcm'. At the first layer—Determine candidate system intents, the candidate system intent model of the digital assistant determines no matches for any system intents. At the second layer—Determine candidate skills, the candidate skills model of the digital assistant will identify the top two matches as the accounts skill and personal information skill, which are within the win margin parameter. Again, in this instance, the personal information match is >0.8, and thus more than a current context only threshold parameter. The candidate skills model is ignored, and the context aware router of the digital assistant will maintain the skill context as 'personal information' and the group context as 'Entity_1.hcm. And then for the candidate skill, at the third layer—Determine candidate flows, the candidate flows model identifies a candidate flow (i.e., intent) within the current skill context and group context that scored highly, i.e., the flow for providing telephone number under personal information. Note in this instance the user does get what they intended to get.

Figure 11:
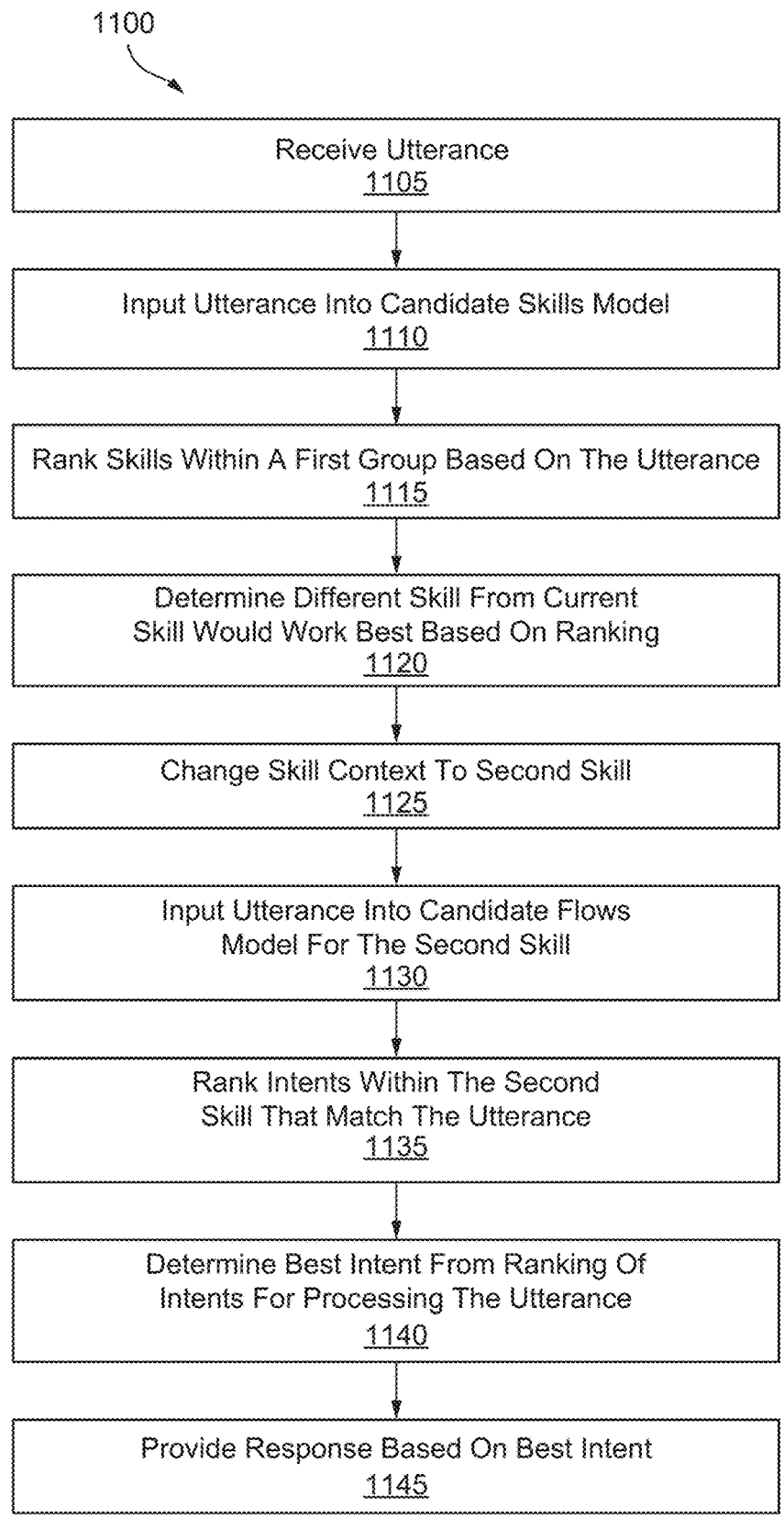
FIG. 11 illustrates a process flow for context aware routing with skill groups in accordance with various embodiments.

FIG. 11 illustrates a process flow for context aware routing with skill groups in accordance with various embodiments. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 2-4, the processing depicted in FIG. 11 may be performed by various subsystems, models, or modules to route conversations (e.g., digital assistant 206, a master bot 214, and skill bots 216-1, 216-2, and 216-3, etc.). Routing of conversations using the operations described with respect to FIG. 11 may perform more efficiently or otherwise more effectively in routing OOS utterances.

At step 1105, an utterance is received from a user within a chatbot session. A current skill context of the chatbot session may be a first skill and a current group context of the chatbot session is a first group. The first group defines a domain space that includes a first set of skills including the first skill and a second skill. The first set of skills are associated with the first group by identifying or providing a name or label of the first group within a configuration page of each of the skills within the first set of skills.

At step 1110, the utterance is input into a candidate skills model for the first group. The candidate skills model may be a machine-learning model trained to evaluate utterances using one or more NLP algorithms and measure how well skills within the first set of skills match with the user's utterance.

At step 1115, a ranking of skills within the first group that could potentially process the utterance is obtained using the candidate skills model. The obtaining the ranking of skills comprises evaluating the utterance and generating confidence scores for the skills within the first group (i.e., the first set of skills), identifying any skill with a confidence score exceeding a value of a candidate skills confidence threshold routing parameter as a candidate skill for further evaluation, and ranking the candidate skills based on the confidence scores as skills within the first group that could potentially process the utterance. In some instances, the candidate skills confidence threshold routing parameter is set at 40% confidence.

At step 1120, based on the ranking of skills, a second skill is determined as a highest ranked skill for processing the utterance and treated as a candidate skill for further evaluation. It should be understood, that additional skills could be treated as candidate skills for further evaluation. For example, if a win margin parameter is configured for the digital assistant, then it is possible a third skill (e.g., determined as a second highest ranked skill for processing the utterance) may be within the win margin parameter, and thus also treated as a candidate skill for further evaluation.

At step 1125, the current skill context of the chatbot session is changed to the second skill. Note that in the instance multiple skills are identified as candidate skills for further evaluation, the current skill context of the chatbot session may be changed to include the second skill and all other skills identified as candidate skills. In other words, the skill context may not be limited to simply the highest ranking skill.

At step 1130, the utterance is input into a candidate flows model for the second skill. The candidate flows model may be a machine-learning model trained to evaluate utterances using one or more NLP algorithms and measure how well intents associated with the second skill match with the user's utterance. In some instances, the machine-learning model is an intent classifier.

At step 1135, a ranking of intents within the second skill that match the utterance is obtained using the candidate flows model. The obtaining the ranking of skills comprises evaluating the utterance and generating confidence scores for the skills within the first group, identifying any skill with a confidence score exceeding a value of a candidate skills confidence threshold routing parameter as a candidate skill for further evaluation, and ranking the candidate skills based on the confidence scores as skills within the first group that could potentially process the utterance. In some instances, the candidate skills confidence threshold routing parameter is set at 70% confidence.

At step 1140, based on the ranking of intents, an intent that is a highest ranked intent is determined for processing the utterance. It should be understood, that additional skills and intents could be treated as candidate skills and intents for further evaluation. For example, if a win margin parameter and confidence win margin are configured for the digital assistant and skills, then it is possible a third skill (e.g., determined as a second highest ranked skill for processing the utterance) and associated intents may be within the win margin parameter and confidence win margin, and thus also treated as a candidate skill and intents for further evaluation.

At step 1145, a conversation flow in initiated in the chatbot session with the user based on the intent that is the highest ranked intent for processing the utterance. It should be understood, that if multiple intents are identified for further evaluation (e.g., based on confidence win margin), then the flow may be a disambiguation flow prompting a response to the user to clarify their utterance between multiple skills and/or intents.

Illustrative Systems

Figure 12:
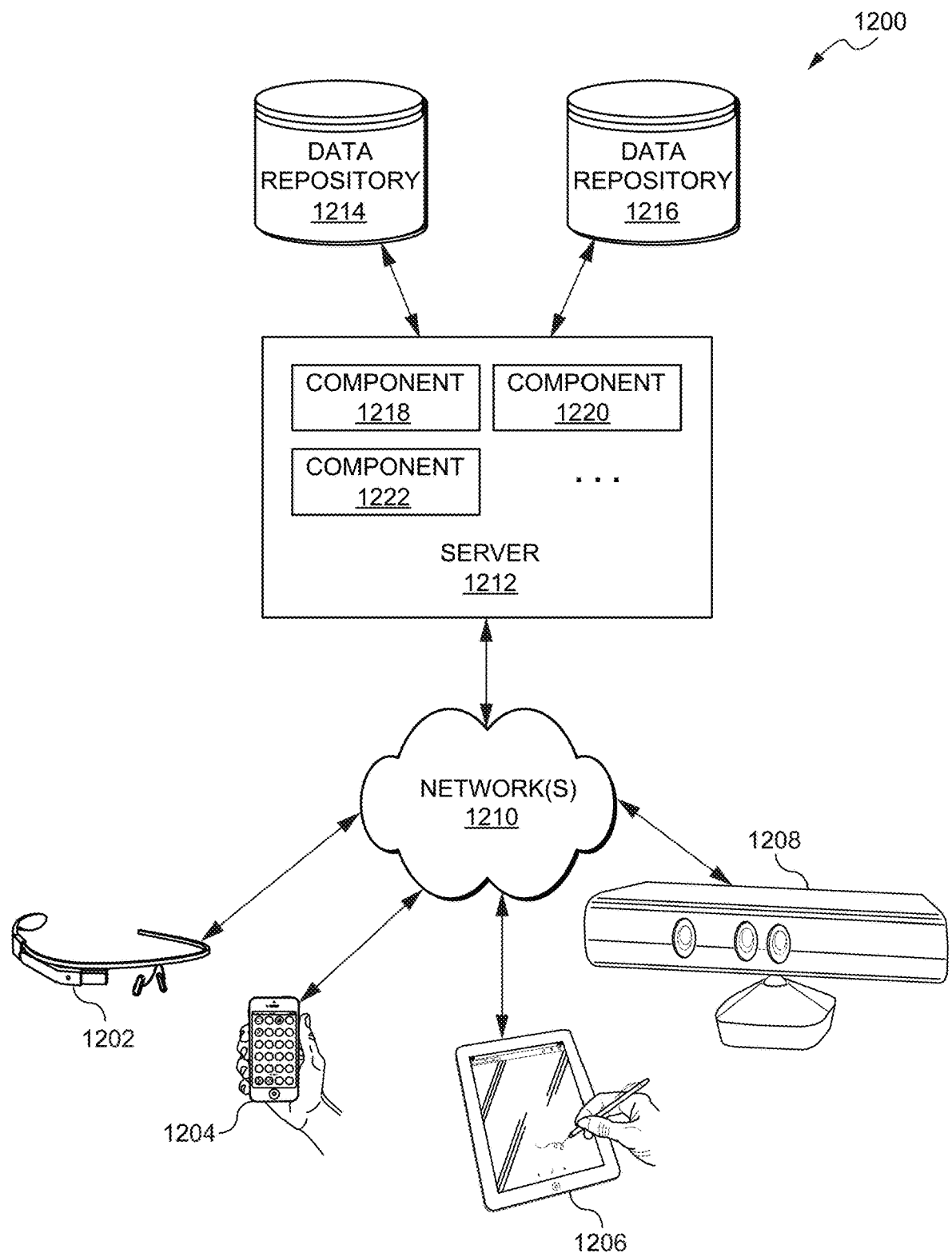
FIG. 12 depicts a simplified diagram of a distributed system for implementing various embodiments.

FIG. 12 depicts a simplified diagram of a distributed system 1200. In the illustrated example, distributed system 1200 includes one or more client computing devices 1202, 1204, 1206, and 1208, coupled to a server 1212 via one or more communication networks 1210. Clients computing devices 1202, 1204, 1206, and 1208 may be configured to execute one or more applications.

In various examples, server 1212 may be adapted to run one or more services or software applications that enable one or more embodiments described in this disclosure. In certain examples, server 1212 may also provide other services or software applications that may include non-virtual and virtual environments. In some examples, these services may be offered as web-based or cloud services, such as under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in FIG. 12, server 1212 may include one or more components 1218, 1220 and 1222 that implement the functions performed by server 1212. These components may include software components that may be executed by one or more processors, hardware components, or combinations thereof. It should be appreciated that various different system configurations are possible, which may be different from distributed system 1200. The example shown in FIG. 12 is thus one example of a distributed system for implementing an example system and is not intended to be limiting.

Users may use client computing devices 1202, 1204, 1206, and/or 1208 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 12 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1210 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1210 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 may include one or more virtual machines running virtual operating systems, or other computing architectures involving virtualization such as one or more flexible pools of logical storage devices that may be virtualized to maintain virtual storage devices for the server. In various examples, server 1212 may be adapted to run one or more services or software applications that provide the functionality described in the foregoing disclosure.

The computing systems in server 1212 may run one or more operating systems including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more data repositories 1214, 1216. These data repositories may be used to store data and other information in certain examples. For example, one or more of the data repositories 1214, 1216 may be used to store information such as information related to chatbot performance or generated models for use by chatbots used by server 1212 when performing various functions in accordance with various embodiments. Data repositories 1214, 1216 may reside in a variety of locations. For example, a data repository used by server 1212 may be local to server 1212 or may be remote from server 1212 and in communication with server 1212 via a network-based or dedicated connection. Data repositories 1214, 1216 may be of different types. In certain examples, a data repository used by server 1212 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1214, 1216 may also be used by applications to store application data. The data repositories used by applications may be of different types such as, for example, a key-value store repository, an object store repository, or a general storage repository supported by a file system.

Figure 13:
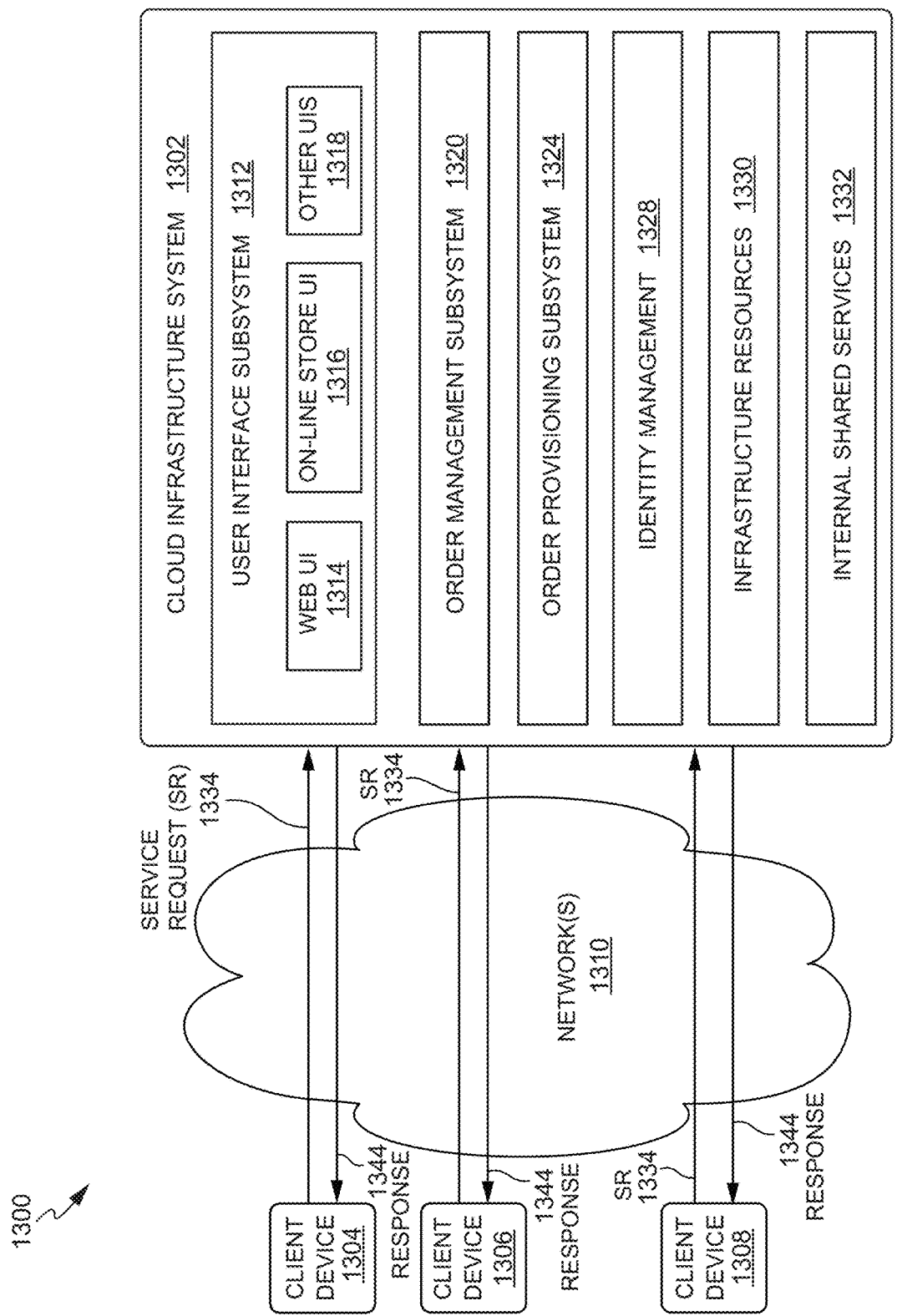
FIG. 13 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 13 is a simplified block diagram of a cloud-based system environment in which various services may be offered as cloud services in accordance with certain examples. In the example depicted in FIG. 13, cloud infrastructure system 1302 may provide one or more cloud services that may be requested by users using one or more client computing devices 1304, 1306, and 1308. Cloud infrastructure system 1302 may comprise one or more computers and/or servers that may include those described above for server 1212. The computers in cloud infrastructure system 1302 may be organized as general purpose computers, specialized server computers, server farms, server clusters, or any other appropriate arrangement and/or combination.

Network(s) 1310 may facilitate communication and exchange of data between clients 1304, 1306, and 1308 and cloud infrastructure system 1302. Network(s) 1310 may include one or more networks. The networks may be of the same or different types. Network(s) 1310 may support one or more communication protocols, including wired and/or wireless protocols, for facilitating the communications.

The example depicted in FIG. 13 is only one example of a cloud infrastructure system and is not intended to be limiting. It should be appreciated that, in some other examples, cloud infrastructure system 1302 may have more or fewer components than those depicted in FIG. 13, may combine two or more components, or may have a different configuration or arrangement of components. For example, although FIG. 13 depicts three client computing devices, any number of client computing devices may be supported in alternative examples.

The term cloud service is generally used to refer to a service that is made available to users on demand and via a communication network such as the Internet by systems (e.g., cloud infrastructure system 1302) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1302 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1302 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1302. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1302. Cloud infrastructure system 1302 then performs processing to provide the services requested in the customer's subscription order. For example, a user may use utterances to request the cloud infrastructure system to take a certain action (e.g., an intent), as described above, and/or provide services for a chat bot system as described herein. Cloud infrastructure system 1302 may be configured to provide one or even multiple cloud services.

Cloud infrastructure system 1302 may provide the cloud services via different deployment models. In a public cloud model, cloud infrastructure system 1302 may be owned by a third party cloud services provider and the cloud services are offered to any general public customer, where the customer may be an individual or an enterprise. In certain other examples, under a private cloud model, cloud infrastructure system 1302 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1302 and the services provided may be shared by several organizations in a related community. Various other models such as hybrids of the above mentioned models may also be used.

Client computing devices 1304, 1306, and 1308 may be of different types (such as client computing devices 1202, 1204, 1206, and 1208 depicted in FIG. 12) and may be capable of operating one or more client applications. A user may use a client device to interact with cloud infrastructure system 1302, such as to request a service provided by cloud infrastructure system 1302. For example, a user may use a client device to request information or action from a chatbot as described in this disclosure.

In some examples, the processing performed by cloud infrastructure system 1302 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1302 for generating and training one or more models for a chat bot system. The data used for this analysis may include structured data (e.g., data stored in a database or structured according to a structured model) and/or unstructured data (e.g., data blobs (binary large objects)).

As depicted in the example in FIG. 13, cloud infrastructure system 1302 may include infrastructure resources 1330 that are utilized for facilitating the provision of various cloud services offered by cloud infrastructure system 1302. Infrastructure resources 1330 may include, for example, processing resources, storage or memory resources, networking resources, and the like. In certain examples, the storage virtual machines that are available for servicing storage requested from applications may be part of cloud infrastructure system 1302. In other examples, the storage virtual machines may be part of different systems.

In certain examples, to facilitate efficient provisioning of these resources for supporting the various cloud services provided by cloud infrastructure system 1302 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1302 may itself internally use services 1332 that are shared by different components of cloud infrastructure system 1302 and which facilitate the provisioning of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1302 may comprise multiple subsystems. These subsystems may be implemented in software, or hardware, or combinations thereof. As depicted in FIG. 13, the subsystems may include a user interface subsystem 1312 that enables users or customers of cloud infrastructure system 1302 to interact with cloud infrastructure system 1302. User interface subsystem 1312 may include various different interfaces such as a web interface 1314, an online store interface 1316 where cloud services provided by cloud infrastructure system 1302 are advertised and are purchasable by a consumer, and other interfaces 1318. For example, a customer may, using a client device, request (service request 1334) one or more services provided by cloud infrastructure system 1302 using one or more of interfaces 1314, 1316, and 1318. For example, a customer may access the online store, browse cloud services offered by cloud infrastructure system 1302, and place a subscription order for one or more services offered by cloud infrastructure system 1302 that the customer wishes to subscribe to. The service request may include information identifying the customer and one or more services that the customer desires to subscribe to. For example, a customer may place a subscription order for a service offered by cloud infrastructure system 1302. As part of the order, the customer may provide information identifying a chat bot system for which the service is to be provided and optionally one or more credentials for the chat bot system.

In certain examples, such as the example depicted in FIG. 13, cloud infrastructure system 1302 may comprise an order management subsystem (OMS) 1320 that is configured to process the new order. As part of this processing, OMS 1320 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1320 may then invoke the order provisioning subsystem (OPS) 1324 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1324 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1302 as part of the provisioning process. Cloud infrastructure system 1302 may generate an application ID and select a storage virtual machine for an application from among storage virtual machines provided by cloud infrastructure system 1302 itself or from storage virtual machines provided by other systems other than cloud infrastructure system 1302.

Cloud infrastructure system 1302 may send a response or notification 1344 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chat bot system ID generated by cloud infrastructure system 1302 and information identifying a chat bot system selected by cloud infrastructure system 1302 for the chat bot system corresponding to the chat bot system ID.

Cloud infrastructure system 1302 may provide services to multiple customers. For each customer, cloud infrastructure system 1302 is responsible for managing information related to one or more subscription orders received from the customer, maintaining customer data related to the orders, and providing the requested services to the customer. Cloud infrastructure system 1302 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1302 may provide services to multiple customers in parallel. Cloud infrastructure system 1302 may store information for these customers, including possibly proprietary information. In certain examples, cloud infrastructure system 1302 comprises an identity management subsystem (IMS) 1328 that is configured to manage customer information and provide the separation of the managed information such that information related to one customer is not accessible by another customer. IMS 1328 may be configured to provide various security-related services such as identity services, such as information access management, authentication and authorization services, services for managing customer identities and roles and related capabilities, and the like.

Figure 14:
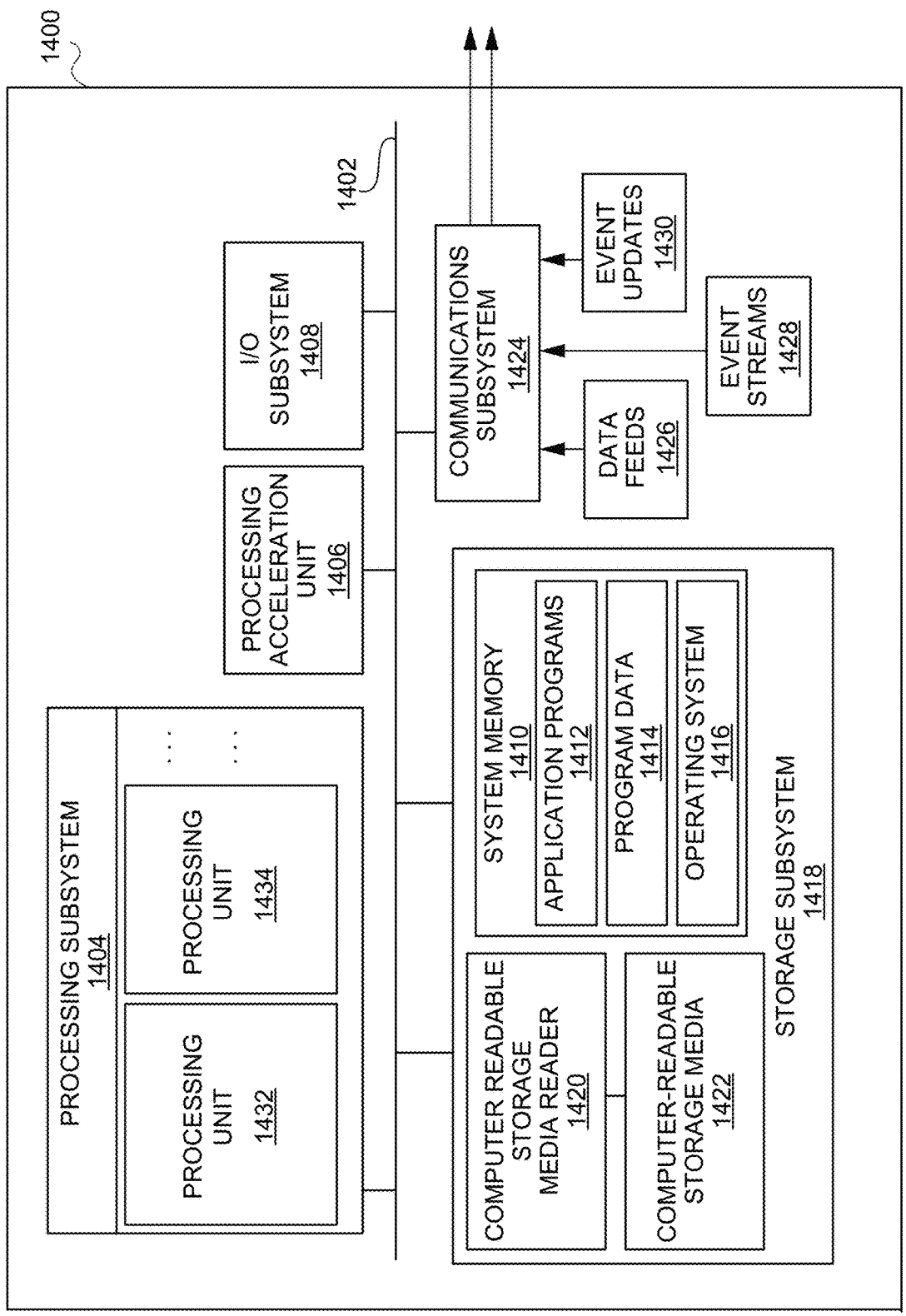
FIG. 14 illustrates an example computer system that may be used to implement various embodiments.

FIG. 14 illustrates an example of computer system 1400. In some examples, computer system 1400 may be used to implement any of the digital assistant or chat bot systems within a distributed environment, and various servers and computer systems described above. As shown in FIG. 14, computer system 1400 includes various subsystems including a processing subsystem 1404 that communicates with a number of other subsystems via a bus subsystem 1402. These other subsystems may include a processing acceleration unit 1406, an I/O subsystem 1408, a storage subsystem 1418, and a communications subsystem 1424. Storage subsystem 1418 may include non-transitory computer-readable storage media including storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative examples of the bus subsystem may utilize multiple buses. Bus subsystem 1402 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1404 controls the operation of computer system 1400 and may comprise one or more processors, application specific integrated circuits (ASICs), or field programmable gate arrays (FPGAs). The processors may include be single core or multicore processors. The processing resources of computer system 1400 may be organized into one or more processing units 1432, 1434, etc. A processing unit may include one or more processors, one or more cores from the same or different processors, a combination of cores and processors, or other combinations of cores and processors. In some examples, processing subsystem 1404 may include one or more special purpose co-processors such as graphics processors, digital signal processors (DSPs), or the like. In some examples, some or all of the processing units of processing subsystem 1404 may be implemented using customized circuits, such as application specific integrated circuits (ASICs), or field programmable gate arrays (FPGAs).

In some examples, the processing units in processing subsystem 1404 may execute instructions stored in system memory 1410 or on computer readable storage media 1422. In various examples, the processing units may execute a variety of programs or code instructions and may maintain multiple concurrently executing programs or processes. At any given time, some or all of the program code to be executed may be resident in system memory 1410 and/or on computer-readable storage media 1422 including potentially on one or more storage devices. Through suitable programming, processing subsystem 1404 may provide various functionalities described above. In instances where computer system 1400 is executing one or more virtual machines, one or more processing units may be allocated to each virtual machine.

In certain examples, a processing acceleration unit 1406 may optionally be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term input device is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1400 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information and data that is used by computer system 1400. Storage subsystem 1418 provides a tangible non-transitory computer-readable storage medium for storing the basic programming and data constructs that provide the functionality of some examples. Storage subsystem 1418 may store software (e.g., programs, code modules, instructions) that when executed by processing subsystem 1404 provides the functionality described above. The software may be executed by one or more processing units of processing subsystem 1404. Storage subsystem 1418 may also provide authentication in accordance with the teachings of this disclosure.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM), dynamic random access memory (DRAM), and the like.

By way of example, and not limitation, as depicted in FIG. 14, system memory 1410 may load application programs 1412 that are being executed, which may include various applications such as Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1422 may store programming and data constructs that provide the functionality of some examples. Computer-readable media 1422 may provide storage of computer-readable instructions, data structures, program modules, and other data for computer system 1400. Software (programs, code modules, instructions) that, when executed by processing subsystem 1404 provides the functionality described above, may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1418 may also include a computer-readable storage media reader 1420 that may further be connected to computer-readable storage media 1422. Reader 1420 may receive and be configured to read data from a memory device such as a disk, a flash drive, etc.

In certain examples, computer system 1400 may support virtualization technologies, including but not limited to virtualization of processing and memory resources. For example, computer system 1400 may provide support for executing one or more virtual machines. In certain examples, computer system 1400 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1400. Accordingly, multiple operating systems may potentially be run concurrently by computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices. For example, when computer system 1400 is used to implement bot system 120 depicted in FIG. 1, the communication subsystem may be used to communicate with a chatbot system selected for an application.

Communication subsystem 1424 may support both wired and/or wireless communication protocols. In certain examples, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1424 may provide wired network connectivity (e.g., Ethernet) in addition to or instead of a wireless interface.

Communication subsystem 1424 may receive and transmit data in various forms. In some examples, in addition to other forms, communications subsystem 1424 may receive input communications in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to communicate data from computer system 1400 to other computer systems or networks. The data may be communicated in various different forms such as structured and/or unstructured data feeds 1426, event streams 1428, event updates 1430, and the like to one or more databases that may be in communication with one or more streaming data source computers coupled to computer system 1400.

Computer system 1400 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
receiving an utterance from a user within a chatbot session, wherein a current skill context of the chatbot session is a first skill and a current group context of the chatbot session is a first group;

obtaining, using a candidate skills model for the first group, a ranking of skills within the first group that could potentially process the utterance;

determining, based on the ranking of skills, a second skill is a highest ranked skill for processing the utterance and a third skill is a second highest ranked skill for processing the utterance;

determining both the second skill and the third skill are within a win margin parameter;

changing the current skill context of the chatbot session to the second skill and the third skill;

obtaining, using a candidate flows model for the second skill, a ranking of intents within the second skill that match the utterance;

obtaining, using another candidate flows model for the third skill, a ranking of intents within the third skill that match the utterance; and determining, based on the ranking of intents within the second skill and the ranking of intents within the third skill, an intent that is a highest ranked intent for processing the utterance.

2. The computer-implemented method of claim 1, wherein the obtaining the ranking of skills comprises evaluating the utterance and generating confidence scores for the skills within the first group, identifying any skill with a confidence score exceeding a value of a candidate skills confidence threshold routing parameter as a candidate skill for further evaluation, and ranking the candidate skills based on the confidence scores as skills within the first group that could potentially process the utterance.

3. The computer-implemented method of claim 1, wherein the obtaining the ranking of intents within the second skill and the third skill comprises evaluating the intents and generating confidence scores for the intents within the second skill and the third skill, identifying any intent with a confidence score exceeding a value of a confidence threshold routing parameter as a candidate intent for further evaluation, and ranking the candidate intents based on the confidence scores as intents within the second skill and the third skill that match the utterance.

4. The computer-implemented method of claim 1, further comprising initiating a conversation flow in the chatbot session with the user based on the intent that is the highest ranked intent for processing the utterance.

5. The computer-implemented method of claim 1, further comprising:

receiving an initial utterance from a user within the chatbot session, wherein the initial utterance is receive prior to the utterance;

inputting the initial utterance into the candidate skills model;

obtaining, using the candidate skills model, a ranking of skills that could potentially process the initial utterance;

determining, based on the ranking of skills, the first skill is a highest ranked skill for processing the initial utterance; and assigning the current skill context of the chatbot session to the first skill and the current group context of the chatbot session to the first group, wherein the first group is defined for the first skill, and the assignment of the current group context of the chatbot session to the first group is performed based on the first group being defined for the first skill.

6. A system comprising:
one or more data processors; and a non-transitory computer readable storage medium containing instructions which, when executed on the one or more data processors, cause the one or more data processors to perform actions including:

receiving an utterance from a user within a chatbot session, wherein a current skill context of the chatbot session is a first skill and a current group context of the chatbot session is a first group;

obtaining, using a candidate skills model for the first group, a ranking of skills within the first group that could potentially process the utterance;

determining, based on the ranking of skills, a second skill is a highest ranked skill for processing the utterance and a third skill is a second highest ranked skill for processing the utterance;

determining both the second skill and the third skill are within a win margin parameter;

changing the current skill context of the chatbot session to the second skill and the third skill;

obtaining, using a candidate flows model for the second skill, a ranking of intents within the second skill that match the utterance;

obtaining, using another candidate flows model for the third skill, a ranking of intents within the third skill that match the utterance; and determining, based on the ranking of intents within the second skill and the ranking of intents within the third skill, an intent that is a highest ranked intent for processing the utterance.

7. The system of claim 6, wherein the obtaining the ranking of skills comprises evaluating the utterance and generating confidence scores for the skills within the first group, identifying any skill with a confidence score exceeding a value of a candidate skills confidence threshold routing parameter as a candidate skill for further evaluation, and ranking the candidate skills based on the confidence scores as skills within the first group that could potentially process the utterance.

8. The system of claim 6, wherein the obtaining the ranking of intents within the second skill and the third skill comprises evaluating the intents and generating confidence scores for the intents within the second skill and the third skill, identifying any intent with a confidence score exceeding a value of a confidence threshold routing parameter as a candidate intent for further evaluation, and ranking the candidate intents based on the confidence scores as intents within the second skill and the third skill that match the utterance.

9. The system of claim 6, wherein the actions further comprise initiating a conversation flow in the chatbot session with the user based on the intent that is the highest ranked intent for processing the utterance.

10. The system of claim 6, wherein the actions further comprise:

receiving an initial utterance from a user within the chatbot session, wherein the initial utterance is receive prior to the utterance;

inputting the initial utterance into the candidate skills model;

obtaining, using the candidate skills model, a ranking of skills that could potentially process the initial utterance;

determining, based on the ranking of skills, the first skill is a highest ranked skill for processing the initial utterance; and assigning the current skill context of the chatbot session to the first skill and the current group context of the chatbot session to the first group, wherein the first group is defined for the first skill, and the assignment of the current group context of the chatbot session to the first group is performed based on the first group being defined for the first skill.

11. A computer-program product tangibly embodied in a non-transitory machine-readable storage medium, including instructions configured to cause one or more data processors to perform actions including:
receiving an utterance from a user within a chatbot session, wherein a current skill context of the chatbot session is a first skill and a current group context of the chatbot session is a first group;
obtaining, using a candidate skills model for the first group, a ranking of skills within the first group that could potentially process the utterance;
determining, based on the ranking of skills, a second skill is a highest ranked skill for processing the utterance and a third skill is a second highest ranked skill for processing the utterance;
determining both the second skill and the third skill are within a win margin parameter;
changing the current skill context of the chatbot session to the second skill and the third skill;
obtaining, using a candidate flows model for the second skill, a ranking of intents within the second skill that match the utterance;
obtaining, using another candidate flows model for the third skill, a ranking of intents within the third skill that match the utterance; and
determining, based on the ranking of intents within the second skill and the ranking of intents within the third skill, an intent that is a highest ranked intent for processing the utterance.

12. The computer-program product of claim 11, wherein the obtaining the ranking of skills comprises evaluating the utterance and generating confidence scores for the skills within the first group, identifying any skill with a confidence score exceeding a value of a candidate skills confidence threshold routing parameter as a candidate skill for further evaluation, and ranking the candidate skills based on the confidence scores as skills within the first group that could potentially process the utterance.

13. The computer-program product of claim 11, wherein the obtaining the ranking of intents within the second skill and the third skill comprises evaluating the intents and generating confidence scores for the intents within the second skill and the third skill, identifying any intent with a confidence score exceeding a value of a confidence threshold routing parameter as a candidate intent for further evaluation, and ranking the candidate intents based on the confidence scores as intents within the second skill and the third skill that match the utterance.

14. The computer-program product of claim 11, wherein the actions further comprise initiating a conversation flow in the chatbot session with the user based on the intent that is the highest ranked intent for processing the utterance.

15. The computer-program product of claim 11, wherein the actions further comprise:
receiving an initial utterance from a user within the chatbot session, wherein the initial utterance is receive prior to the utterance;
inputting the initial utterance into the candidate skills model;
obtaining, using the candidate skills model, a ranking of skills that could potentially process the initial utterance;
determining, based on the ranking of skills, the first skill is a highest ranked skill for processing the initial utterance; and
assigning the current skill context of the chatbot session to the first skill and the current group context of the chatbot session to the first group, wherein the first group is defined for the first skill, and the assignment of the current group context of the chatbot session to the first group is performed based on the first group being defined for the first skill.

\* \* \* \* \*

UNITED STATES PATENT AND TRADEMARK OFFICE
CERTIFICATE OF CORRECTION

| | |
|---|---|
| PATENT NO. | : 12,223,276 B2 |
| APPLICATION NO. | : 18/424178 |
| DATED | : February 11, 2025 |
| INVENTOR(S) | : Vishnoi et al. |

It is certified that error appears in the above-identified patent and that said Letters Patent is hereby corrected as shown below:

In the Drawings

On sheet 10 of 15, in FIG. 10A, under reference numeral 1005, Line 5, delete "ntent" and insert -- intent --, therefor.

In the Specification

In Column 4, Line 61, delete "banking" and insert -- banking. --, therefor.

In Column 5, Line 5, delete "domain" and insert -- domain. --, therefor.

In Column 5, Line 7, delete "domain" and insert -- domain. --, therefor.

In Column 5, Line 32, delete "domain" and insert -- domain. --, therefor.

In Column 13, Line 27, delete "bot— A" and insert -- bot—A --, therefor.

In Column 14, Line 29, delete "section— A" and insert -- section—A --, therefor.

In Column 14, Line 64, delete "bot— DABP" and insert -- bot—DABP --, therefor.

In Column 22, Line 44, before "candidate" delete "the".

In Column 22, Lines 47-48, delete "(unresolvedlntent))." and insert -- (unresolvedIntent)). --, therefor.

In Column 23, Line 21, delete "unresolvedlntent)" and insert -- unresolvedIntent) --, therefor.

In Column 24, Line 10, delete "pinning" and insert -- pinning. --, therefor.

Signed and Sealed this
Sixth Day of May, 2025

Coke Morgan Stewart
*Acting Director of the United States Patent and Trademark Office*

In Column 27, Line 15, delete "acme.*group." and insert -- acme.* group. --, therefor.

In Column 27, Line 23, delete "acme.*group," and insert -- acme.* group, --, therefor.